(12) United States Patent
Bickham et al.

(10) Patent No.: US 12,474,522 B2
(45) Date of Patent: Nov. 18, 2025

(54) COMPLIANT OPTICAL FIBER

(71) Applicant: CORNING INCORPORATED, Corning, NY (US)

(72) Inventors: Scott Robertson Bickham, Corning, NY (US); Snigdharaj Kumar Mishra, Wilmington, NC (US); Pushkar Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 281 days.

(21) Appl. No.: 18/130,987

(22) Filed: Apr. 5, 2023

(65) Prior Publication Data

US 2023/0341619 A1    Oct. 26, 2023

Related U.S. Application Data

(60) Provisional application No. 63/334,255, filed on Apr. 25, 2022.

(51) Int. Cl.
*G02B 6/028* (2006.01)
*G02B 6/02* (2006.01)
(Continued)

(52) U.S. Cl.
CPC ....... *G02B 6/0288* (2013.01); *G02B 6/02395* (2013.01); *G02B 6/0283* (2013.01);
(Continued)

(58) Field of Classification Search
CPC .................. G02B 6/02395; G02B 6/0281; G02B 6/0283; G02B 6/0288; G02B 6/03627; G02B 6/0365; G02B 6/4401
See application file for complete search history.

(56) References Cited

U.S. PATENT DOCUMENTS 10,908,354 B2    2/2021  Morita et al.
11,036,000 B2 *  6/2021  Bickham ............ G02B 6/02395
(Continued)

FOREIGN PATENT DOCUMENTS

CN    111381314 A       7/2020
JP    7384827 B2 *  11/2023  ......... G02B 6/02395
(Continued)

OTHER PUBLICATIONS

English translation of JP-7384827-B2 (Year: 2019).*
(Continued)

*Primary Examiner* — Uyen Chau N Le
*Assistant Examiner* — Darby M. Thomason
(74) *Attorney, Agent, or Firm* — Kevin L. Bray

(57) ABSTRACT

An optical fiber including a core region having an outer radius $r_1$ in a range from 4.0 μm to 8.0 μm and a relative refractive index profile $\Delta_1$ with a maximum relative refractive index $\Delta_{1max}$ in a range from 0.20% to 0.50%, a cladding region comprising a trench cladding region having a minimum relative refractive index $\Delta_{3\ min}$ greater than −0.60% and less than −0.10%, and a trench volume greater than 30%-μm² and an outer cladding region having a relative refractive index $\Delta_4$ in a range from −0.10% to 0.10%. The optical fiber also including a primary coating and a secondary coating. The optical fiber has a mode field diameter at 1310 nm of greater than 8.8 microns, a cable cutoff wavelength of less than 1260 nm, a zero dispersion wavelength between 1300 nm and 1324 nm, and low macrobend loss at 1550 nm.

23 Claims, 4 Drawing Sheets

(51) Int. Cl.
*G02B 6/036* (2006.01)
*G02B 6/44* (2006.01)

(52) U.S. Cl.
CPC ......... *G02B 6/0365* (2013.01); *G02B 6/4401* (2013.01); *G02B 6/0281* (2013.01); *G02B 6/03627* (2013.01)

(56) References Cited

U.S. PATENT DOCUMENTS

| | | | |
|---|---|---|---|
| 11,181,687 | B2 | 11/2021 | Bennett et al. |
| 2018/0127593 | A1 | 5/2018 | Chen et al. |
| 2019/0331848 | A1 | 10/2019 | Bennett et al. |
| 2019/0331849 | A1 | 10/2019 | Bennett et al. |
| 2019/0331850 | A1* | 10/2019 | Bennett ............. G02B 6/03694 |
| 2019/0384026 | A1* | 12/2019 | Bickham ............. G02B 6/0365 |
| 2020/0225404 | A1* | 7/2020 | Bickham ............. G02B 6/03627 |
| 2020/0284976 | A1* | 9/2020 | Bookbinder ......... G02B 6/0283 |
| 2020/0400882 | A1 | 12/2020 | Mukasa |
| 2021/0048579 | A1 | 2/2021 | Munige et al. |
| 2021/0055490 | A1* | 2/2021 | Bennett ................. G02B 6/368 |
| 2021/0208335 | A1* | 7/2021 | Abedijaberi ....... G02B 6/03694 |
| 2021/0231896 | A1 | 7/2021 | Bickham et al. |
| 2021/0405286 | A1* | 12/2021 | Li ....................... G02B 6/0286 |
| 2022/0026627 | A1 | 1/2022 | Bickham et al. |

FOREIGN PATENT DOCUMENTS

| | | |
|---|---|---|
| WO | 2020/241531 A1 | 12/2020 |
| WO | 2021/039914 A1 | 3/2021 |

OTHER PUBLICATIONS

International Search Report and Written Opinion of the International Searching Authority; PCT/US2023/018884; dated Jun. 21, 2023; 15 pages; European Patent Office.

Glaesemann, et al., "Quantifying the Puncture Resistance of Optical Fiber Coatings", International Wire & Cable Symposium, 2003, pp. 237-245.

* cited by examiner

US 12,474,522 B2

COMPLIANT OPTICAL FIBER

This Application claims the benefit of priority to U.S. Provisional Patent Application Ser. No. 63/334,255 filed on Apr. 25, 2022, the content of which is relied upon and incorporated herein by reference in its entirety.

FIELD OF THE DISCLOSURE

The present disclosure generally relates to optical fibers, and more particularly relates to a compliant reduced diameter optical fiber having bending performance and cost effective manufacturing.

BACKGROUND OF THE DISCLOSURE

Optical fibers are widely used in telecommunications applications. Optical fibers having small cladding and coating diameters are attractive for reducing the size of cables, decreasing cable costs and increasing the bandwidth density of optical interconnects. It has become desirable to use thinner coating layers in reduced-cladding diameter fibers to make the overall diameter smaller. The material properties and dimensions of the coating layers may need to be optimized in conjunction with the refractive index profile of the glass to achieve low microbending attenuation penalties, low bend loss and high puncture resistance. It may be desirable to provide for an optical fiber having optimal bending performance with a reduced cladding and coating diameters and cost affordable manufacturing.

SUMMARY OF THE DISCLOSURE

According to one embodiment of the disclosure, an optical fiber is provided and includes a core region having an outer radius $r_1$ in a range from 4.0 μm to 8.0 μm and a relative refractive index profile $\Delta_1$ with a maximum relative refractive index $\Delta_{1max}$ in a range from 0.20% to 0.50%, and a cladding region surrounding and directly adjacent to the core region, the cladding region comprising a trench cladding region surrounding the core region, the trench cladding region having an inner radius $r_2$, an outer radius $r_3$, a relative refractive index $\Delta_3$ with a minimum relative refractive index $\Delta_{3\ min}$ greater than −0.60% and less than −0.10%, and a trench volume greater than 30% μm² and an outer cladding region surrounding and directly adjacent to the trench cladding region, the outer cladding region having an outer radius $r_4$ and a relative refractive index $\Delta_4$ in a range from −0.10% to 0.10%. The optical fiber also includes a primary coating surrounding and directly adjacent to the cladding region, the primary coating having a radius $r_5$, an in situ modulus in the range from 0.05 MPa to 0.30 MPa and a thickness $r_5-r_4$ in the range from 10 microns to 25 microns, and a secondary coating surrounding and directly adjacent to the primary coating, the secondary coating having a radius $r_6$ less than or equal to 90.0 microns, a Young's modulus greater than 1600 MPa and a thickness $r_6-r_5$ in the range from 8 microns to 20 microns, wherein the optical fiber has a mode field diameter at 1310 nm of greater than 8.8 microns, a cable cutoff wavelength of less than 1260 nm and a zero dispersion wavelength between 1300 nm and 1324 nm, wherein the optical fiber has a macrobend loss at 1550 nm, in accordance with a mandrel wrap test using a mandrel with a diameter of 15 mm, less than 1.0 dB/turn, and wherein the optical fiber has a macrobend loss at 1550 nm, in accordance with a mandrel wrap test using a mandrel with a diameter of 30 mm, less than 0.005 dB/10 turns.

According to another embodiment of the disclosure, an optical fiber is provided and includes a core region having an outer radius $r_1$ in a range from 4.0 μm to 8.0 μm and a relative refractive index profile $\Delta_1$ with a maximum relative refractive index $\Delta_{1max}$ in a range from 0.20% to 0.50%, and a cladding region surrounding and directly adjacent to the core region, the cladding region comprising a trench cladding region surrounding the core region, the trench cladding region having an inner radius $r_2$, an outer radius $r_3$, a relative refractive index $\Delta_3$ with a minimum relative refractive index $\Delta_{3\ min}$ greater than −0.60% and less than 0.00%, and a trench volume greater than 30% μm², and an outer cladding region surrounding and directly adjacent to the trench cladding region, the outer cladding region having an outer radius $r_4$ between 62 microns and 63 microns and a relative refractive index $\Delta_4$ in a range from −0.10% to 0.10%. The optical fiber also includes a primary coating surrounding and directly adjacent to the cladding region, the primary coating having a radius $r_5$, an in situ modulus in the range from 0.05 MPa to 0.30 MPa and a thickness $r_5-r_4$ in the range from 10 microns to 22 microns, and a secondary coating surrounding and directly adjacent to the primary coating, the secondary coating having a radius $r_6$ less than or equal to 90.0 microns, a Young's modulus greater than 1600 MPa and a thickness $r_6-r_5$ in the range from 8 microns to 17 microns, wherein the optical fiber has a mode field diameter at 1310 nm of greater than 8.8 microns, a cable cutoff wavelength of less than 1260 nm and a zero dispersion wavelength between 1300 nm and 1324 nm, wherein the optical fiber has a macrobend loss at 1550 nm, in accordance with a mandrel wrap test using a mandrel with a diameter of 15 mm, less than 1.0 dB/turn, and wherein the optical fiber has a macrobend loss at 1550 nm, in accordance with a mandrel wrap test using a mandrel with a diameter of 30 mm, less than 0.053 dB/10 turns.

According to yet another embodiment of the disclosure, an optical fiber is provided and includes a core region having an outer radius $r_1$ in a range from 4.0 μm to 8.0 μm and a relative refractive index profile $\Delta_1$ with a maximum relative refractive index $\Delta_{1max}$ in a range from 0.20% to 0.50%, a cladding region surrounding and directly adjacent to the core region, the cladding region comprising a trench cladding region surrounding the core region, the trench cladding region having an inner radius $r_2$, an outer radius $r_3$, a relative refractive index $\Delta_3$ with a minimum relative refractive index $\Delta_{3\ min}$ greater than −0.60% and less than 0.00%, and a trench volume greater than 30% μm², and an outer cladding region surrounding and directly adjacent to the trench cladding region, the outer cladding region having an outer radius $r_4$ between 45 and 55 microns and a relative refractive index $\Delta_4$ in a range from −0.10% to 0.10%. The optical fiber also includes a primary coating surrounding and directly adjacent to the cladding region, the primary coating having a radius $r_5$, an in situ modulus in the range from 0.05 MPa to 0.30 MPa and a thickness $r_5-r_4$ in the range from 10 microns to 25 microns, and a secondary coating surrounding and directly adjacent to the primary coating, the secondary coating having a radius $r_6$ less than or equal to 90.0 microns, a Young's modulus greater than 1600 MPa and a thickness $r_6-r_5$ in the range from 8 microns to 20 microns, wherein the optical fiber has a mode field diameter at 1310 nm of greater than 8.8 microns, a cable cutoff wavelength of less than 1260 nm and a zero dispersion wavelength between 1300 nm and 1324 nm, wherein the optical fiber has a macrobend loss at 1550 nm, in accordance with a mandrel wrap test using a mandrel with a diameter of 15 mm, less than 1.0 dB/turn, and wherein the optical fiber has a macrobend loss at 1550 nm, in accordance with a mandrel wrap test using a mandrel with a diameter of 30 mm, less than 0.05 dB/10 turns.

According to yet another embodiment of the disclosure, an optical fiber is provided and includes a core region having an outer radius $r_1$ in a range from 4.0 μm to 8.0 μm and a relative refractive index profile $\Delta_1$ with a maximum relative refractive index $\Delta_{1max}$ in a range from 0.20% to 0.50%, a cladding region surrounding and directly adjacent to the core region, the cladding region comprising a trench cladding region surrounding the core region, the trench cladding region having an inner radius $r_2$, an outer radius $r_3$, a relative refractive index $\Delta_3$ with a minimum relative refractive index $\Delta_{3\ min}$ greater than −0.60% and less than 0.00%, and a trench volume greater than 30-% μm², and an outer cladding region surrounding and directly adjacent to the trench cladding region, the outer cladding region having an outer radius $r_4$ less than 45 microns and a relative refractive index $\Delta_4$ in a range from −0.10% to 0.10%. The optical fiber also includes a primary coating surrounding and directly adjacent to the cladding region, the primary coating having a radius $r_5$, an in situ modulus in the range from 0.05 MPa to 0.30 MPa and a thickness $r_5-r_4$ in the range from 10 microns to 25 microns, and a secondary coating surrounding and directly adjacent to the primary coating, the secondary coating having a radius $r_6$ less than or equal to 90.0 microns, a Young's modulus greater than 1600 MPa and a thickness $r_6-r_5$ in the range from 8 microns to 20 microns, wherein the optical fiber has a mode field diameter at 1310 nm of greater than 8.8 microns, a cable cutoff wavelength of less than 1260 nm and a zero dispersion wavelength between 1300 nm and 1324 nm, wherein the optical fiber has a macrobend loss at 1550 nm, in accordance with a mandrel wrap test using a mandrel with a diameter of 15 mm, less than 1.0 dB/turn, and wherein the optical fiber has a macrobend loss at 1550 nm, in accordance with a mandrel wrap test using a mandrel with a diameter of 30 mm, less than 0.05 dB/10 turns.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiments, and together with the description serve to explain principles and operation of the various embodiments.

DETAILED DESCRIPTION

Figure 1:
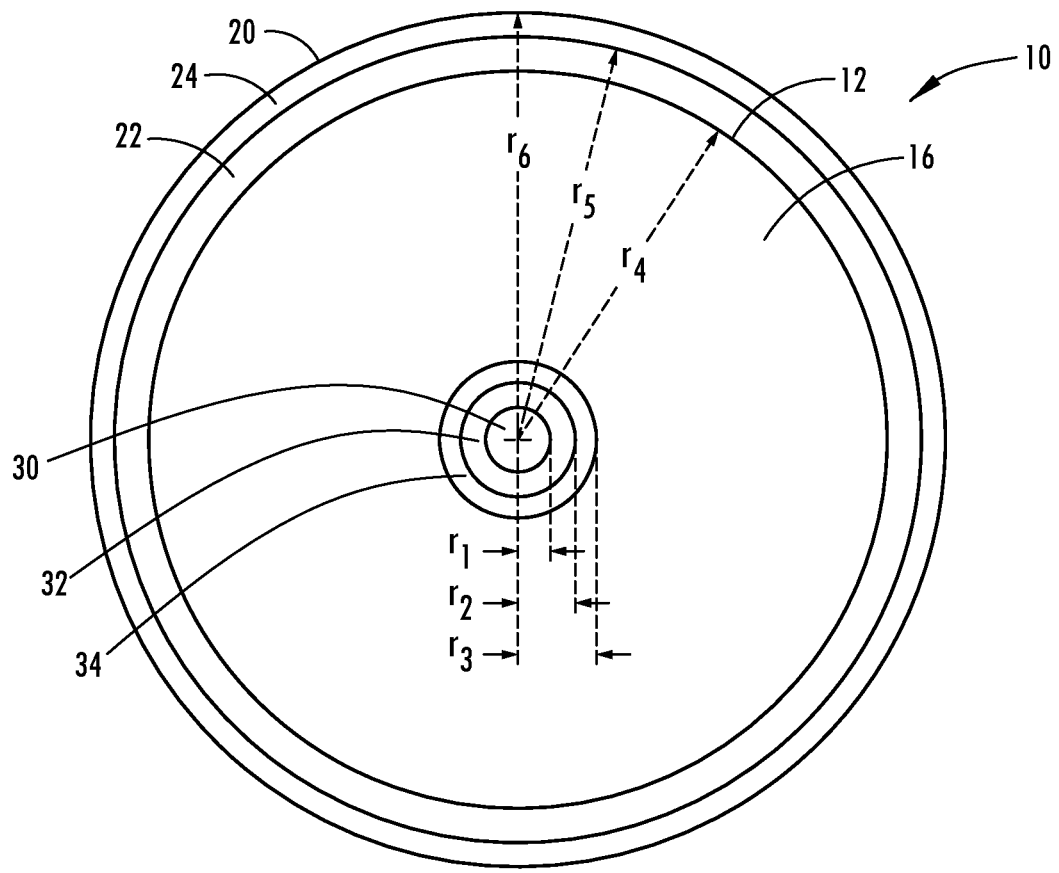
FIG. 1 is an end view of an optical fiber having a core region surrounded by an inner cladding region, trench cladding region and an outer cladding region, according to one example.

The present disclosure is provided as an enabling teaching and can be understood more readily by reference to the following description, drawings, examples, and claims. To this end, those skilled in the relevant art will recognize and appreciate that many changes can be made to the various aspects of the embodiments described herein, while still obtaining the beneficial results. It will also be apparent that some of the desired benefits of the present embodiments can be obtained by selecting some of the features without utilizing other features. Accordingly, those who work in the art will recognize that many modifications and adaptations are possible and can even be desirable in certain circumstances and are a part of the present disclosure. Therefore, it is to be understood that this disclosure is not limited to the specific compositions, articles, devices, and methods disclosed unless otherwise specified. It is also to be understood that the terminology used herein is for the purposes of describing particular aspects only and is not intended to be limiting.

In this specification and in the claims that follow, reference will be made to a number of terms which shall be defined to have the following meanings:

"Include," "includes," or like terms means encompassing but not limited to, that is, inclusive and not exclusive.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When a value is said to be about or about equal to a certain number, the value is within 110% of the number. For example, a value that is about 10 refers to a value between 9 and 11, inclusive. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

In some embodiments, the term "about" references terms or endpoints in a range. For example, about 1, 2, or 3 is equivalent to about 1, about 2, or about 3, and further comprises from about 1 to 3, from about 1 to 2, and from about 2 to 3. Specific and preferred values disclosed for compositions, components, ingredients, additives, and like aspects, and ranges thereof, are for illustration only; they do not exclude other defined values or other values within defined ranges. The compositions and methods of the disclosure include those having any value or any combination of the values, specific values, more specific values, and preferred values described herein.

The indefinite article "a" or "an" and its corresponding definite article "the" as used herein means at least one, or one or more, unless specified otherwise.

Where a range of numerical values is recited herein, comprising upper and lower values, unless otherwise stated in specific circumstances, the range is intended to include the endpoints thereof, and all integers and fractions within the range. It is not intended that the scope of the claims be limited to the specific values recited when defining a range. Further, when an amount, distance, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed. Finally, when the term "about" is used in describing a value or an end point of a range, the disclosure should be understood to include the specific value or end point referred to. When a numerical value or end point of a range does not recite "about," the numerical value or end point of a range is intended to include two embodiments: one modified by "about," and one not modified by "about." In embodiments in which a numerical value or endpoint of a range is modified by "about," "about" is intended to account for routine errors or uncertainties in experiment or measurement familiar to those of skill in the art and, unless otherwise stated, "about" shall encompass a deviation of ±5% from the specified numerical value or endpoint.

As used herein, "comprising" is an open-ended transitional phrase. A list of elements following the transitional phrase "comprising" is a non-exclusive list, such that elements in addition to those specifically recited in the list may also be present.

The term "wherein" is used as an open-ended transitional phrase, to introduce a recitation of a series of characteristics of the structure.

The terms "comprising," and "comprises," e.g., "A comprises B," is intended to include as special cases the concepts of "consisting" and "consisting essentially of" as in "A consists of B" or "A consists essentially of B".

The term "or," as used herein, is inclusive; more specifically, the phrase "A or B" means "A, B, or both A and B." Exclusive "or" is designated herein by terms such as "either A or B" and "one of A or B," for example.

As used herein, contact refers to direct contact or indirect contact. Direct contact refers to contact in the absence of an intervening material and indirect contact refers to contact through one or more intervening materials. Elements in direct contact touch each other. Elements in indirect contact do not touch each other, but are rigidly or flexibly joined through one or more intervening materials. Contacting refers to placing two elements in direct or indirect contact. Elements in direct (indirect) contact may be said to directly (indirectly) contact each other.

As used herein, "directly adjacent" means directly contacting and "indirectly adjacent" mean indirectly contacting. The term "adjacent" encompasses elements that are directly or indirectly adjacent to each other. The term "directly surrounds" means "surrounding and directly adjacent to."

"Optical fiber" refers to a waveguide having a glass portion surrounded by a coating. The glass portion includes a core and a cladding, and is referred to herein as a "glass fiber."

"Radial position", "radius", or the radial coordinate "r" refers to radial position relative to the centerline (r=0) of the glass fiber.

The terms "inner" and "outer" are used to refer to relative values of radial coordinate or relative positions of regions of the optical fiber, where "inner" means closer to the centerline of the fiber than "outer." An inner radial coordinate is closer to the centerline of the glass fiber than an outer radial coordinate. An inner radial coordinate is between the centerline of the glass fiber and an outer radial coordinate. An inner region of an optical fiber is closer to the centerline of the glass fiber than an outer region. An inner region of an optical fiber is between the centerline of the glass fiber and the outer region of the glass fiber.

The term "mode" refers to guided mode. A single-mode optical fiber is an optical fiber designed to support only the fundamental $LP_{01}$ modes over a substantial length of the optical fiber (e.g., at least several meters), but that under certain circumstances can support multiple modes over short distances (e.g., tens of centimeters). The optical fibers disclosed herein are single-mode optical fibers at a wavelength of 1550 nm.

The term "µm" or "micron" means micrometer; that is, $10^{-6}$ m.

"Refractive index" refers to the refractive index at a wavelength of 1550 nm.

The "refractive index profile" is the relationship between refractive index or relative refractive index and radius. For relative refractive index profiles depicted herein as having step boundaries between adjacent core and/or cladding regions, normal variations in processing conditions may preclude obtaining sharp step boundaries at the interface of adjacent regions. It is to be understood that although boundaries of refractive index profiles may be depicted herein as step changes in refractive index, the boundaries in practice may be rounded or otherwise deviate from perfect step function characteristics. It is further understood that the value of the relative refractive index may vary with radial position within the core region and/or any of the cladding regions. When relative refractive index varies with radial position in a particular region of the fiber (e.g., core region and/or any of the cladding regions), it is expressed in terms of its actual or approximate functional dependence, or its value at a particular position within the region, or in terms of an average value applicable to the region as a whole. Unless otherwise specified, if the relative refractive index of a region (e.g., core region and/or any of the cladding regions) is expressed as a single value or as a parameter (e.g., Δ or Δ% or %) applicable to the region as a whole, it is understood that the relative refractive index in the region is constant, or approximately constant, and corresponds to the single value, or that the single value or parameter represents an average value of a non-constant relative refractive index dependence with radial position in the region. For example, if "i" is a region of the glass fiber, the parameter Δi refers to the average value of relative refractive index in the region as defined by $\Delta_{ave}$ given in Eq. (2) below, unless otherwise specified. Whether by design or a consequence of normal manufacturing variability, the dependence of relative refractive index on radial position may be sloped, curved, or otherwise non-constant.

"Relative refractive index," as used herein, is defined in Eq. (1) for any radial position r as:

$$\Delta\% = 100\frac{\left(n^2 - n_{ref}^2\right)}{2n^2} \quad (1)$$

where n is the refractive index at the radial position r in the glass fiber, unless otherwise specified and $n_{ref}$ is the refractive index of pure silica glass, unless otherwise specified. For purposes of the present disclosure, $n_{ref}=1.444$, which is the refractive index of pure silica at 1550 nm. Accordingly, as used herein, the relative refractive index percent is relative to pure silica glass. As used herein, the relative refractive index is represented by $\Delta$ (or "delta") or $\Delta\%$ (or "delta %") and its values are given in units of "%", unless otherwise specified. Relative refractive index may also be expressed as $\Delta(r)$ or $\Delta(r)$ %. When referring to a specific region i of the optical fiber, relative refractive index may also be expressed as $\Delta_i$, $\Delta_i\%$, $\Delta_i(r)$ or $\Delta_i(r)$ %.

The average relative refractive index ($\Delta_{ave}$) of a region of the fiber is determined from Eq. (2):

$$\Delta_{ave} = \int_{r_{inner}}^{r_{outer}} \frac{\Delta(r)dr}{(r_{outer} - r_{inner})} \quad (2)$$

where $r_{inner}$ is the inner radius of the region, $r_{outer}$ is the outer radius of the region, and $\Delta(r)$ is the relative refractive index of the region.

The term "α-profile" refers to a relative refractive index profile $\Delta(r)$ that has the functional form defined in Eq. (3):

$$\Delta(r) = \Delta(r_0)\left[1 - \left[\frac{|r-r_0|}{(r_z - r_0)}\right]^\alpha\right] \quad (3)$$

where $r_o$ is the radial position at which $\Delta(r)$ is maximum, $r_z > r_0$ is the radial position at which $\Delta(r)$ decreases to its minimum value, and r is in the range $r_i \leq r \leq r_f$, where $r_i$ is the initial radial position of the α-profile, $r_f$ is the final radial position of the α-profile, and α is a real number. $\Delta(r_0)$ for an α-profile may be referred to herein as $\Delta_{max}$ or, when referring to a specific region i of the fiber, as $\Delta_{i,max}$. When the relative refractive index profile of the fiber core region is described by an α-profile with $r_0$ occurring at the centerline (r=0) and $r_z$ corresponding to the outer radius $r_1$ of the core region, and $\Delta_1(r_1)=0$, Eq. (3) simplifies to Eq. (4):

$$\Delta_1(r) = \Delta_{1max}\left[1 - \left[\frac{r}{r_1}\right]^\alpha\right] \quad (4)$$

"Effective area" of an optical fiber is defined as:

$$A_{eff} = \frac{2\pi\left[\int_0^\infty (f(r))^2 r dr\right]^2}{\int_0^\infty (f(r))^4 r dr}$$

where f(r) is the transverse component of the electric field of the guided optical signal and r is radial position in the fiber. "Effective area" or "$A_{eff}$" depends on the wavelength of the optical signal and is understood herein to refer to a wavelength of 1550 nm, unless otherwise specified.

The "mode field diameter" or "MFD" of optical fiber is in Eq. (5) as:

$$MFD = 2w \quad (5)$$

$$w^2 = 2\frac{\int_0^\infty (f(r))^2 r dr}{\int_0^\infty \left(\frac{df(r)}{dr}\right)^2 r dr}$$

where f(r) is the transverse component of the electric field distribution of the guided optical signal and r is radial position in the fiber. "Mode field diameter" or "MFD" depends on the wavelength of the optical signal in the optical fiber. Specific indication of the wavelength will be made when referring to mode field diameter herein. Unless otherwise specified, mode field diameter refers to the $LP_{01}$ mode at the specified wavelength.

"Trench" or "trench region" or "trench cladding region" refers to the portion of the cladding surrounded by and directly adjacent to the outer cladding region. A trench is situated between the outer radius $r_1$ of the core and the inner radius $r_3$ of the outer cladding region and has a relative refractive index $\Delta_3$ less than the relative refractive index $\Delta_4$ of the outer cladding region. In a preferred embodiment, an inner cladding region surrounds and is directly adjacent to the core, and a trench cladding region surrounds and is directly adjacent to the inner cladding region, where the inner cladding region has a relative refractive index $\Delta_2$ less than the relative refractive index $\Delta 1$ of the core and greater than the relative refractive index $\Delta_3$ of the trench cladding region.

"Trench volume" is defined as:

$$V_{Trench} = \left|2\int_{r_{Trench,inner}}^{r_{Trench,outer}} (\Delta_{Trench}(r) - \Delta_4) r dr\right| \quad (6)$$

where $r_{Trench,inner}$ is the inner radius $r_2$ of the trench cladding region, $r_{Trench,outer}$ is the outer radius $r_3$ of the trench cladding region, $\Delta_{Trench}(r)=\Delta_3(r)$ is the relative refractive index of the trench cladding region, and $\Delta_4$ is the average relative refractive index of the outer cladding region of the glass fiber. In embodiments in which a trench cladding region is directly adjacent to a core region, $r_2=r_1$. In embodiments in which a trench cladding region is directly adjacent to an inner cladding region, $r_{Trench,inner}$ is $r_2>r_1$, $r_{Trench,outer}$ is $r_3$, and $\Delta_{Trench}$ is $\Delta_3(r)$. Trench volume is defined as an absolute value and has a positive value. Trench volume is expressed herein in units of % $\Delta$-micron$^2$, % $\Delta$-μm$^2$, or %-micron$^2$, %-μm$^2$, whereby these units can be used interchangeably herein.

"Chromatic dispersion," herein referred to as "dispersion" unless otherwise noted, of an optical fiber is the sum of the material dispersion, the waveguide dispersion, and the inter-modal dispersion. In the case of single mode waveguide fibers, the inter-modal dispersion is zero.

Dispersion values in a two-mode regime assume inter-modal dispersion is zero. Dispersion is reported herein at wavelengths of 1310 nm and 1550 nm, and is expressed in units of ps/nm-km.

The cutoff wavelength of an optical fiber is the minimum wavelength at which the optical fiber will support only one propagating mode. Cutoff wavelength will be reported herein as a cable cutoff wavelength. The cable cutoff wavelength is based on a 22-meter cabled fiber length as specified in TIA-455-80: FOTP-80 IEC-60793-1-44 Optical Fibres—Part 1-44: Measurement Methods and Test Procedures—Cut-off Wavelength (21 May 2003), by Telecommunications Industry Association (TIA).

The term "bend diameter" refers to the diameter of the mandrel used to determine macrobend loss using the mandrel wrap test specified in the standard TIA-455-62: FOTP-62 IEC-60793-1-47 Optical Fibres—Part 1-47: Measurement Methods and Test Procedures—Macrobending Loss, by Telecommunications Industry Association (TIA).

The optical fibers disclosed herein include a core region, a cladding region surrounding the core region, and a coating surrounding the cladding region. The core region and cladding region are glass. The cladding region includes multiple regions that may differ in relative refractive index. The multiple cladding regions are preferably concentric regions. In preferred embodiments, the cladding region includes a trench cladding region. The trench cladding region surrounds the core region and is surrounded by and directly adjacent to an outer cladding region. In a preferred embodiment, the trench cladding region is directly adjacent to an inner cladding region and the inner cladding region is directly adjacent to the core region. The core region, cladding region, inner cladding region, trench cladding region, and outer cladding region are also referred to as core, cladding, inner cladding, trench, and outer cladding, respectively.

Whenever used herein, radial position $r_1$ and relative refractive index $\Delta_1$ or $\Delta_1(r)$ refer to the core region, radial position $r_2$ and relative refractive index $\Delta_2$ or $\Delta_2(r)$ refer to the inner cladding region, radial position $r_3$ and relative refractive index $\Delta_3$ or $\Delta_3(r)$ refer to the trench cladding region, radial position $r_4$ and relative refractive index $\Delta_4$ or $\Delta_4(r)$ refer to the outer cladding region.

The relative refractive index $\Delta_1(r)$ has a maximum value $\Delta_{1max}$ and a minimum value $\Delta_{1min}$. The relative refractive index $\Delta_2(r)$ has a maximum value $\Delta_{2max}$ and a minimum value $\Delta_{2min}$. The relative refractive index $\Delta_3(r)$ has a maximum value $\Delta_{3max}$ and a minimum value $\neq_{3\ min}$. The relative refractive index $\Delta_4(r)$ has a maximum value $\Delta_{4max}$ and a minimum value $\Delta_{4min}$. In embodiments in which the relative refractive index is constant or approximately constant over a region, the maximum and minimum values of the relative refractive index are equal or approximately equal. Unless otherwise specified, if a single value is reported for the relative refractive index of a region, the single value corresponds to an average value for the region.

It is understood that the core region is the central region of the glass fiber and is substantially cylindrical in shape, and that a surrounding inner cladding region, a surrounding trench cladding region, and a surrounding outer cladding region are substantially annular in shape. Annular regions may be characterized in terms of an inner radius and an outer radius. Radial positions $r_1$, $r_2$, $r_3$, and $r_4$ refer herein to the outermost radii of the core region, inner cladding region, trench cladding region, and outer cladding region, respectively. The radius $r_4$ corresponds to the outer radius of the glass fiber.

When two regions are directly adjacent to each other, the outer radius of the inner of the two regions coincides with the inner radius of the outer of the two regions. In one embodiment, for example, the glass fiber includes a trench cladding region surrounded by and directly adjacent to an outer cladding region. In such an embodiment, the radius $r_3$ corresponds to the outer radius of the trench cladding region and the inner radius of the outer cladding region. In preferred embodiments herein, the trench cladding region has an inner radius $r_2$ and an outer radius $r_3$ and the radius $r_2 > r_1$ corresponds to the outer radius of the inner cladding region and the inner radius of the trench cladding region.

The following terminology applies to the disclosed embodiments in which the relative refractive index profile includes an inner cladding region surrounding and directly adjacent to the core region, a trench cladding region surrounding and directly adjacent to the inner cladding region, and an outer cladding region surrounding and directly adjacent to the trench cladding region. The difference between radial position $r_2$ and radial position $r_1$ is referred to herein as the thickness or width of the inner cladding region. In all embodiments, herein the difference between radial position $r_3$ and radial position $r_2$ is referred to herein as the thickness or width of the trench cladding region. The difference between radial position $r_4$ and radial position $r_3$ is referred to herein as the thickness or width of the outer cladding region.

As will be described further hereinbelow, the relative refractive indices of the core region, inner cladding region, trench cladding region, and outer cladding region differ. Each of the regions is formed from doped or undoped silica glass. Variations in refractive index relative to undoped silica glass are accomplished by incorporating updopants or downdopants at levels designed to provide a targeted refractive index or refractive index profile using techniques known to those of skill in the art. Updopants are dopants that increase the refractive index of the glass relative to the undoped glass composition. Downdopants are dopants that decrease the refractive index of the glass relative to the undoped glass composition. In one embodiment, the undoped glass is pure silica glass. When the undoped glass is pure silica glass, updopants include Cl, Br, Ge, Al, P, Ti, Zr, Nb, and Ta, and downdopants include F and B. Regions of constant refractive index may be formed by not doping (e.g., pure silica) or by doping at a uniform concentration. Regions of variable refractive index are formed through non-uniform spatial distributions of dopants and/or through incorporation of different dopants in different regions. Refractive index varies approximately linearly with the concentration of the updopant or downdopant. For example, each 1 wt % Cl as a dopant in silica glass increases the relative refractive index by about 0.083% and each 1 wt % F as a dopant in silica glass decreases the relative refractive index by about 0.32%.

The coatings formed on glass fibers are formed from curable coating compositions. Curable coating compositions include one or more curable components. As used herein, the term "curable" is intended to mean that the component, when exposed to a suitable source of curing energy, includes one or more curable functional groups capable of forming covalent bonds that participate in linking the component to itself or to other components of the coating composition. The product obtained by curing a curable coating composition is referred to herein as the cured product of the composition. The cured product is preferably a polymer. The curing process is induced by energy. Forms of energy include radiation or thermal energy. In a preferred embodiment, curing occurs with radiation, where radiation refers to electromagnetic radiation. Curing induced by radiation is referred to herein as radiation curing or photocuring. A radiation-curable component is a component that can be induced to undergo a curing reaction when exposed to radiation of a suitable wavelength at a suitable intensity for a sufficient period of time. Suitable wavelengths include wavelengths in the infrared, visible, or ultraviolet portion of the electromagnetic spectrum. The radiation curing reaction occurs in the presence of a photoinitiator. A radiation-curable component may also be thermally curable. Similarly, a thermally curable component is a component that can be induced to undergo a curing reaction when exposed to thermal energy of sufficient intensity for a sufficient period of time. A thermally curable component may also be radiation curable.

A curable component includes one or more curable functional groups. A curable component with only one curable functional group is referred to herein as a monofunctional curable component. A curable component having two or more curable functional groups is referred to herein as a multifunctional curable component Multifunctional curable components include two or more functional groups capable of forming covalent bonds during the curing process and can introduce crosslinks into the polymeric network formed during the curing process. Multifunctional curable components may also be referred to herein as "crosslinkers" or "curable crosslinkers." Curable components include curable monomers and curable oligomers. Examples of functional groups that participate in covalent bond formation during the curing process are identified hereinafter.

The term "(meth)acrylate" means methacrylate, acrylate, or a combination of methacrylate and acrylate.

Reference will now be made in detail to illustrative embodiments of the present description.

Referring to FIG. 1, the terminal end of an optical fiber 10 is shown having an inner glass region 12 containing a core region 30 surrounded by a cladding region which includes an inner cladding region 32, a trench cladding region 34 and an outer cladding region 16, according to one example. The core region 30 defines a core-portion of inner glass region 12 and may be a glass core region having a circular shape in cross section. The glass region 12 is surrounded by an outer coating 20 which may include a primary coating 22 surrounded by a secondary coating 24. Additionally, a tertiary layer (e.g., an ink layer, not shown) may surround the secondary coating 24.

The optical fiber 10 advantageously has a 1310 nm mode field diameter (MFD) larger than 8.8 microns and exhibits low macrobend less at both small and large bend diameters.

The present disclosure relates to glass fibers and optical fibers having low macrobend loss at bend diameters between 10 mm and 40 mm. Bend diameters greater than 25 mm are commonly encountered when attaching connectors to optical fibers and when the optical fiber is cabled and bend diameters less than 25 mm are commonly encountered when positioning or configuring optical fibers in tight or compact installation spaces. As described herein, macrobend loss at bend diameters over the range from 10 mm to 40 mm can be mitigated through proper design of the refractive index profile of the optical fiber. In particular, inclusion of a trench cladding region between the core region and the cladding region reduces macrobend loss over a wide range of bend diameters.

Glass Fiber. The optical fibers disclosed herein include an inner glass region 12 with a core region 30 and a cladding region surrounding the core region 30 along with a coating surrounding the cladding region. The inner glass region 12 containing the core region 30 and cladding region are glass. The inner glass region 12 includes the core region 30, the inner cladding region 32, the trench cladding region 34, and the outer cladding region 16. Core region 30 has a higher refractive index than the cladding region and inner glass region 12 functions as a waveguide.

The core region 30 has a circular shape in cross section and an outer radius $r_1$ in a range from 4.0 mm to 8.0 mm and a relative refractive index profile $\Delta_1$ with a maximum relative refractive index $\Delta_{1max}$ in a range from 0.20% to 0.50%. The cladding region surrounds and is directly adjacent to the core region 30. The cladding region in the embodiment of FIG. 1 includes the inner cladding region 32 which directly surrounds the core region 30 and has an outer radius $r_2$. The cladding region also includes a trench cladding region 34 which directly surrounds the inner cladding region 32 and has an inner radius $r_2$ and an outer radius $r_3$. The trench cladding region 34 has a relative refractive index $\Delta_3$ with a minimum relative refractive index $\Delta_{3\ min}$ greater than $-0.60\%$ and less than $-0.10\%$. The trench cladding region 34 has a trench volume greater than $30\%$-$\mu m^2$. The outer cladding region 16 surrounds and is directly adjacent to the trench cladding region 34. The outer cladding region 16 has an outer radius $r_4$ and a relative refractive index $\Delta_4$ in a range from $-0.10\%$ to $0.10\%$, according to one embodiment.

According to another embodiment, the trench cladding region 34 has a relative refractive index $\Delta_3$ with a minimum relative refractive index $\Delta_{3\ min}$ greater than $-0.60\%$ and less than $-0.10\%$, and a trench volume greater than $30\%$-$\mu m^2$. The outer cladding region 16 has an outer radius $r_4$ between 62 µm and 63 µm and a relative refractive index $\Delta_4$ in a range from $-0.10\%$ to $0.10\%$.

According to a further embodiment, the trench cladding region 34 has a relative refractive index $\Delta_3$ with a minimum relative refractive index $\Delta_{3\ min}$ greater than $-0.60\%$ and less than $-0.10\%$, and a trench volume greater than $30\%$-$\mu m^2$. The outer cladding region 16 has an outer radius $r_4$ between 45 µm and 55 µm and a relative refractive index $\Delta_4$ in a range from $-0.10\%$ to $0.10\%$.

According to a further embodiment, the trench cladding region 34 has a relative refractive index $\Delta_3$ with a minimum relative refractive index $\Delta_{3\ min}$ greater than $-0.60\%$ and less than $-0.10\%$, and a trench volume greater than $30\%$-$\mu m^2$. The outer cladding region 16 has an outer radius $r_4$ less than 45 µm and a relative refractive index $\Delta_4$ in a range from $-0.10\%$ to $0.10\%$.

The optical fiber 10 includes a primary coating 22 surrounding and directly adjacent to the cladding region. The primary coating 22 has a radius $r_5$, an in situ modulus in the range from 0.05 MPa to 0.30 MPa and a thickness $r_5$-$r_4$ in the range from 10 µm to 25 µm. Additionally, the optical fiber has a secondary coating 24 surrounding and directly adjacent to the primary coating 22. The secondary coating 24 has a radius $r_6$ less than or equal to 90.0 µm, a Young's modulus greater 1600 MPa and a thickness $r_6$-$r_5$ in the range from 8 µm to 20 µm, according to one embodiment According to another embodiment, the secondary coating 24 has a thickness $r_6$-$r_5$ in the range from 8 µm to 17 µm.

In one embodiment, the optical fiber 10 has a mode field diameter at 1310 nm of greater than 8.8 µm, a cable cutoff wavelength of less than 1260 nm and a zero dispersion of wavelength between 1300 nm and 1324 nm. In this embodiment, the optical fiber has a macrobend loss at 1550 nm, in accordance with a mandrel wrap test using a mandrel with a diameter of 15 mm, less than 1.0 dB/turn. In addition, the optical fiber has a macrobend loss at 1550 nm, in accordance with a mandrel wrap test using a mandrel with a diameter of 30 mm, less than 0.05 dB/10 turns.

The trench cladding region 34 is triangular. In addition, the secondary coating 24 has a radius $r_6$ less than or equal to 85 µm, and more preferably less than or equal to 82.5 µm, and more preferably less than or equal to 80.0 µm.

The thickness of the primary coating 22 is $r_5$-$r_4$ and may be in the range from 10 µm to 25 µm, and more preferably in the range from 11 µm to 20 µm.

The optical fiber 10 may have a puncture resistance greater than 20 g, more preferably a puncture resistance greater than 30 g, and more preferably a puncture resistance greater than 40 g. The optical fiber 10 has a mode field diameter at 1310 nm of greater than 8.8 μm, more preferably greater than 9.0 μm, and more preferably greater than 9.2 μm.

The core region comprises silica glass. The silica glass of the core region 30 may be undoped silica glass, updoped silica glass, and/or downdoped silica glass. In one embodiment, the silica glass of the core region is Ge-free; that is the core region 30 comprises silica glass that lacks Ge. In another embodiment, the core region 30 comprises silica glass doped with germanium dioxide ($GeO_2$). Embodiments of updoped silica glass include silica glass doped with an alkali metal oxide (e.g., $Na_2O$, $K_2O$, $Li_2O$, $Cs_2O$, or $Rb_2O$) and/or a halogen (Cl or Br). Downdoped silica glass includes silica glass doped with F.

In some embodiments, the core region includes an updopant and a downdopant, where the concentration of updopant is highest at the centerline (r=0) (in embodiments without a centerline dip) or near the centerline (r=0) (in embodiments with a centerline dip) and lowest at the radius $r_1$ and the concentration of downdopant is lowest at the centerline (r=0) and highest at the radius $r_1$. In such embodiments, the relative refractive index $\Delta_1$ can have a positive value near the centerline (r=0) and decrease to a negative value at the radius $r_1$.

In some embodiments, the relative refractive index of the core region 30 of the glass fiber is described by an α-profile with an α value in the range from 1.5 to 10, or in the range from 1.7 to 8.0, or in the range from 1.8 to 6.0, or in the range from 1.9 to 5.0, or in the range from 1.95 to 4.5, or in the range from 2.0 to 4.0, or in the range from 10 to 100, or in the range from 10 to 40, or in the range from 12 to 30. As the value of α increases, the relative refractive profile more closely approaches a step index profile. For purposes of the present disclosure, an α-profile with an α value greater than or equal to 10 is regarded as a step index profile.

The outer radius $r_1$ of the core region 30 is in the range from 4.0 μm to 8.0 μm, or in the range from 4.5 μm to 7.5 μm, or in the range from 5.0 μm to 7.0 μm.

The relative refractive index $\Delta_{1max}$ of the core region 30 is in the range from 0.20% to 0.50%, or in the range from 0.25% to 0.45%, or in the range from 0.30% to 0.40. The minimum relative refractive index $\Delta_{1min}$ of the core region 30 is in the range from −0.10% to 0.10%, or in the range from −0.05% to 0.05%, or in the range from −0.02% to 0.02%.

In some embodiments, the relative refractive index of the core region 30 is described by a step-index profile having a constant or approximately constant value corresponding to $\Delta_{1max}$ that extends over at least 70%, or at least 80%, or at least 90% of the distance between the centerline of the optical fiber (r=0) and the outer radius $r_1$.

The cladding region of the embodiment shown in FIG. 1 includes an inner cladding region 32 directly adjacent the core region 30 and a trench cladding region 34 directly adjacent the inner cladding region 32. The inner cladding region 32 has an inner radius $r_1$ as defined above and an outer radius $r_2 > r_1$. The outer radius $r_2$ of the inner cladding region 32 is in the range from 6.0 μm to 15.0 μm, or in the range from 6.5 μm to 12.5 μm, or in the range from 7.0 μm to 10.0 μm. The thickness $r_2 - r_1$ of the inner cladding region 32 is in the range from 1.0 μm to 10.0 μm, or in the range from 1.5 μm to 9.0 μm, or in the range from 2.0 μm to 8.0 μm, or in the range from 2.5 μm to 7.0 μm. The relative refractive index $\Delta_2$ of the inner cladding region 32 is in the range from −0.10% to 0.10%, or in the range from −0.05% to 0.05%, or in the range from −0.02% to 0.02%.

The trench cladding region 34 may comprise downdoped silica glass. The downdopant is F (fluorine) according to one example. The relative refractive index $\Delta_3$ or $\Delta_{3\,min}$ of the trench cladding region 34 is greater than −0.60% and/or less than −0.10%, or greater than −0.55% and/or less than −0.10%, or greater than −0.50% and/or less than −0.20%, or greater than −0.45% and/or less than −0.25%, or in the range from −0.10% to −0.60%, or in the range from −0.15% to −0.55%, or in the range from −0.20% to −0.55%, or in the range from −0.20% to −0.50%, or in the range from −0.25% to −0.50%. In some embodiments, the relative refractive index $\Delta_3$ is constant or approximately constant, and in other embodiments, the relative refractive index $\Delta_3$ decreases monotonically from inner radius $r_2$ to outer radius $r_3$. In one embodiment, the monotonic decrease in $\Delta_3$ exhibits a constant or approximately constant slope. In such embodiments, the trench cladding region 34 is referred to herein as a triangular trench. The monotonic decrease in $\Delta_3$ extends from a maximum value $\Delta_{3max}$ at or near inner radius $r_2$ to a minimum value $\Delta_{3\,min}$ at or near outer radius $r_3$. The relative refractive index $\Delta_{3max}$ is in the range from −0.10% to 0.10%, or in the range from −0.05% to 0.05%, or in the range from −0.02% to 0.02%. In one embodiment, relative refractive index $\Delta_{3max}$ is equal or approximately equal to the relative refractive index $\Delta_{1min}$. In another embodiment, the relative refractive index $\Delta_{3max}$ is equal or approximately equal to the relative refractive index $\Delta_2$.

The inner radius $r_2$ of the trench cladding region 34 is preferably such that $r_2 > r_1$ and has the values specified above. The outer radius $r_3$ of the trench cladding region 34 is in the range from 12.0 μm to 25.0 μm, or in the range from 13.0 μm to 23.0 μm, or in the range from 14.0 μm to 21.0 μm, or in the range from 15.0 μm to 20.0 μm. The thickness $r_3 - r_2$ of the trench cladding region 34 is in the range from 6.0 μm to 14.0 μm, or in the range from 6.5 μm to 13.0 μm, or in the range from 7.0 μm to 12.0 μm.

The trench cladding region 34 has a trench volume greater than 30%-μm$^2$, or greater than 35%-μm$^2$, or greater than 40%-μm$^2$, or greater than 45%-μm$^2$, or greater than 50%-μm$^2$, or greater than 55%-μm$^2$, or in the range from 30%-μm$^2$ to 65%-μm$^2$, or in the range from 35%-μm$^2$ to 60%-μm$^2$, or in the range from 40%-μm$^2$ to 55%-μm$^2$. Trench volume can be controlled by varying the thickness $r_3 - r_2$ of the trench cladding region 34, the relative refractive index ($\Delta_3$, $\Delta_{3\,min}$, and/or $\Delta_{3max}$) of the trench cladding region and/or the difference between the relative refractive index of the outer cladding region ($\Delta_4$) and the relative refractive index of the trench cladding region ($\Delta_3$, $\Delta_{3\,min}$, and/or $\Delta_{3max}$).

In some embodiments, the relative refractive index $\Delta_3$ or $\Delta_{3\,min}$ of the trench cladding region 34 is in the range from −0.60% to −0.10% and the thickness $r_3 - r_2$ of the trench cladding region 34 is in the range from 5.0 μm to 15.0 μm, or in the range from 5.5 μm to 13.0 μm, or in the range from 6.0 μm to 11.0 μm, or in the range from 7.0 μm to 10.0 μm.

In some embodiments, the relative refractive index $\Delta_3$ or $\Delta_{3\,min}$ of the trench cladding region 34 is in the range from −0.55% to −0.10% and the thickness $r_3 - r_2$ of the trench cladding region 34 is in the range from 5.0 μm to 15.0 μm, or in the range from 5.5 μm to 13.0 μm, or in the range from 6.0 μm to 11.0 μm, or in the range from 7.0 μm to 10.0 μm.

In some embodiments, the relative refractive index $\Delta_3$ or $\Delta_{3\,min}$ of the trench cladding region 34 is in the range from −0.50% to −0.20% and the thickness $r_3 - r_2$ of the trench cladding region 34 is in the range from 5.0 μm to 15.0 μm, or in the range from 5.5 μm to 13.0 μm, or in the range from 6.0 μm to 11.0 μm, or in the range from 7.0 μm to 10.0 μm.

In some embodiments, the relative refractive index $\Delta_3$ or $\Delta_{3\ min}$ of the trench cladding region 34 is in the range from −0.45% to −0.25% and the thickness $r_3-r_2$ of the trench cladding region 34 is in the range from 5.0 µm to 15.0 µm, or in the range from 5.5 µm to 13.0 µm, or in the range from 6.0 µm to 11.0 µm, or in the range from 7.0 µm to 10.0 µm.

In some embodiments, the relative refractive index $\Delta_3$ or $\Delta_{3\ min}$ of the trench cladding region 34 is in the range from −0.60% to −0.10% and the trench volume is greater than 30%-µm², or greater than 35%-µm², or greater than 40%-µm², or greater than 45%-µm², or greater than 50%-µm², or greater than 55%-µm², or in the range from 30%-µm² to 65%-µm², or in the range from 3%-µm² to 60%-µm², or in the range from 40%-µm² to 55%-µm².

In some embodiments, the relative refractive index $\Delta_3$ or $\Delta_{3\ min}$ of the trench cladding region 34 is in the range from −0.55% to −0.10% and the trench volume is greater than 30%-µm², or greater than 35%-µm², or greater than 40%-µm², or greater than 45%-µm², or greater than 50%-µm², or greater than 55%-µm², or in the range from 30%-µm² to 65%-µm², or in the range from 35%-µm² to 60%-µm², or in the range from 40%-µm² to 55%-µm².

In some embodiments, the relative refractive index $\Delta_3$ or $\Delta_{3\ min}$ of the trench cladding region 34 is in the range from −0.50% to −0.20% and the trench volume is greater than 30%-µm², or greater than 35%-µm², or greater than 40%-µm², or greater than 45%-µm², or greater than 50%-µm², or greater than 55%-µm², or in the range from 30%-µm² to 65%-µm², or in the range from 35%-µm² to 60%-µm², or in the range from 40%-µm² to 55%-µm².

The relative refractive index $\Delta_4$ or $\Delta_{4max}$ of the outer cladding region 16 is in the range from −0.10% to 0.10%, or in the range from −0.05% to 0.05%, or in the range from −0.02% to 0.02%. The relative refractive index $\Delta_4$ is preferably constant or approximately constant.

The inner radius $r_3$ of the outer cladding region 16 has the values specified above. The outer radius $r_4$ of the outer cladding region 16 is in the range from 57.5 µm to 67.5 µm, or in the range from 60.0 µm to 65.0 µm, or in the range from 61.0 µm to 64.0 µm, or between 62 µm and 63 µm or about 62.5 µm. In other embodiments, the outer radius $r_4$ of the outer cladding region 16 is less than 60.0 µm, or less than 55.0 µm, or less than 52.5 µm, or in the range from 45 µm to 55 µm, or in the range from 47.5 µm to 52.5 µm, or in the range from 48.0 µm to 52.0 µm, or in the range from 49.0 µm to 51.0 µm, or less than 45 µm, or less than 42.5 µm, or in the range from 37.5 µm to 42.5 µm, or in the range from 38.0 µm to 42.0 µm, or in the range from 39.0 µm to 41.0 µm, or. The thickness $r_4-r_3$ of the outer cladding region 16 is in the range from 20.0 µm to 50.0 µm, or in the range from 25.0 µm to 45.0 µm, or in the range from 30.0 µm to 40.0 µm.

Optical Fiber Coatings. The transmissivity of light through an optical fiber is highly dependent on the properties of the coatings applied to the glass fiber. The coatings typically include a primary coating 22 and a secondary coating 24, where the secondary coating surrounds the primary coating and the primary coating contacts the glass fiber (which includes the central core region surrounded by the cladding region). The secondary coating is a harder material (higher Young's modulus (e.g., greater than 1400 MPa)) than the primary coating and is designed to protect the glass fiber from damage caused by abrasion or external forces that arise during processing, handling, and installation of the optical fiber. The primary coating is a softer material (lower Young's modulus (e.g., less than 1 MPa)) than the secondary coating and is designed to buffer or dissipates stresses that result from forces applied to the outer surface of the secondary coating. Dissipation of stresses within the primary coating attenuates the stress and minimizes the stress that reaches the glass fiber. The primary coating is especially important in dissipating stresses that arise due to the microbends that the optical fiber encounters when deployed in a cable. The microbending stresses transmitted to the glass fiber need to be minimized because microbending stresses create local perturbations in the refractive index profile of the glass fiber. The local refractive index perturbations lead to intensity losses for the light transmitted through the glass fiber. By dissipating stresses, the primary coating minimizes microbend-induced intensity losses The primary coating 22 preferably has a higher refractive index than the cladding region of the glass fiber in order to allow it to strip errant optical signals away from the core region. The primary coating should maintain adequate adhesion to the glass fiber during thermal and hydrolytic aging, yet be strippable from the glass fiber for splicing purposes.

Primary and secondary coatings are typically formed by applying a curable coating composition to the glass fiber as a viscous liquid and curing. The optical fiber 10 may also include a tertiary coating (not shown) that surrounds the secondary coating. The tertiary coating may include pigments, inks or other coloring agents to mark the optical fiber for identification purposes and typically has a Young's modulus similar to the Young's modulus of the secondary coating.

Primary Coating Compositions. The primary coating 22 is a cured product of a curable primary coating composition. The curable primary coating compositions provide a primary coating for optical fibers that exhibits low Young's modulus, low pullout force, and strong cohesion. The curable primary coating compositions further enable formation of a primary coating that features clean strippability and high resistance to defect formation during the stripping operation. Low pullout force facilitates clean stripping of the primary coating with minimal residue and strong cohesion inhibits initiation and propagation of defects in the primary coating when it is subjected to stripping forces.

The primary coating is a cured product of a radiation-curable primary coating composition that includes an oligomer, a monomer, a photoinitiator and, optionally, an additive. The following disclosure describes oligomers for the radiation-curable primary coating compositions, radiation-curable primary coating compositions containing at least one of the oligomers, cured products of the radiation-curable primary coating compositions that include at least one of the oligomers, glass fibers coated with a radiation-curable primary coating composition containing at least one of the oligomers, and glass fibers coated with the cured product of a radiation-curable primary coating composition containing at least one of the oligomers.

The oligomer preferably includes a polyether urethane diacrylate compound or a combination of a polyether urethane diacrylate compound and a di-adduct compound. In one embodiment, the polyether urethane diacrylate compound has a linear molecular structure. In one embodiment, the oligomer is formed from a reaction between a diisocyanate compound, a polyol compound, and a hydroxy acrylate compound, where the reaction produces a polyether urethane diacrylate compound as a primary product (majority product) and a di-adduct compound as a byproduct (minority product). The reaction forms a urethane linkage upon reaction of an isocyanate group of the diisocyanate compound and an alcohol group of the polyol. The hydroxy acrylate compound reacts to quench residual isocyanate groups that are present in the composition formed from reaction of the diisocyanate compound and polyol compound. As used herein, the term "quench" refers to conversion of isocyanate groups through a chemical reaction with hydroxyl groups of the hydroxy acrylate compound. Quenching of residual isocyanate groups with a hydroxy acrylate compound converts terminal isocyanate groups to terminal acrylate groups.

The diisocyanate compound, hydroxy acrylate compound and polyol are combined simultaneously and reacted, or are combined sequentially (in any order) and reacted. In one embodiment, the oligomer is formed by reacting a diisocyanate compound with a hydroxy acrylate compound and reacting the resulting product composition with a polyol. In another embodiment, the oligomer is formed by reacting a diisocyanate compound with a polyol compound and reacting the resulting product composition with a hydroxy acrylate compound.

The oligomer is formed from a reaction of a diisocyanate compound, a hydroxy acrylate compound, and a polyol, where the molar ratio of the diisocyanate compound to the hydroxy acrylate compound to the polyol in the reaction process is n:m:p. n, m, and p are referred to herein as mole numbers or molar proportions of diisocyanate, hydroxy acrylate, and polyol; respectively. The mole numbers n, m and p are positive integer or positive non-integer numbers. In embodiments, when p is 2.0, n is in the range from 3.0 to 5.0, or in the range from 3.2 to 4.8, or in the range from 3.4 to 4.6, or in the range from 3.5 to 4.4, or in the range from 3.6 to 4.2, or in the range from 3.7 to 4.0; and m is in the range from 1.5 to 4.0, or in the range from 1.6 to 3.6, or in the range from 1.7 to 3.2, or in the range from 1.8 to 2.8, or in the range from 1.9 to 2.4. For values of p other than 2.0, the molar ratio n:m:p scales proportionally. For example, the molar ratio n:m:p=4.0:3.0:2.0 is equivalent to the molar ratio n:m:p=2.0:1.5:1.0.

The curable primary coating composition further includes one or more monomers. The one or more monomers is/are selected to be compatible with the oligomer, to control the viscosity of the primary coating composition to facilitate processing, and/or to influence the physical or chemical properties of the coating formed as the cured product of the primary coating composition. The monomers include radiation-curable monomers such as ethylenically-unsaturated compounds, ethoxylated acrylates, ethoxylated alkylphenol monoacrylates, propylene oxide acrylates, n-propylene oxide acrylates, isopropylene oxide acrylates, monofunctional acrylates, monofunctional aliphatic epoxy acrylates, multifunctional acrylates, multifunctional aliphatic epoxy acrylates, and combinations thereof.

Representative radiation-curable ethylenically unsaturated monomers include alkoxylated monomers with one or more acrylate or methacrylate groups. An alkoxylated monomer is one that includes one or more alkoxylene groups, where an alkoxylene group has the form —O—R— and R is a linear or branched alkylene group. Examples of alkoxylene groups include ethoxylene (—O—CH2-CH2-), n-propoxylene (—O—CH2-CH2-CH2-), isopropoxylene (—O—CH2-CH(CH3)-, or —O—CH(CH3)-CH2-), etc. As used herein, the degree of alkoxylation refers to the number of alkoxylene groups in the monomer. In one embodiment, the alkoxylene groups are bonded consecutively in the monomer.

In some embodiments, the primary coating composition includes an alkoxylated monomer of the form R4-R5-O—(CH(CH3)CH2-O)q-C(O)CH=CH2, where R4 and R5 are aliphatic, aromatic, or a mixture of both, and q=1 to 10, or R4-O—(CH(CH3)CH2-O)q-C(O)CH=CH2, where C(O) is a carbonyl group, R1 is aliphatic or aromatic, and q=1 to 10.

In some embodiments, the monomer component of the primary coating composition includes a multifunctional (meth)acrylate. Multifunctional ethylenically unsaturated monomers include multifunctional acrylate monomers and multifunctional methacrylate monomers. Multifunctional acrylates are acrylates having two or more polymerizable acrylate moieties per molecule, or three or more polymerizable acrylate moieties per molecule.

In some embodiments, the primary coating composition includes an N-vinyl amide monomer such as an N-vinyl lactam, or N-vinyl pyrrolidinone, or N-vinyl caprolactam.

In addition to a curable monomer and a curable oligomer, the curable primary coating composition also includes a polymerization initiator. The polymerization initiator facilitates initiation of the polymerization process associated with the curing of the coating composition to form the coating. Polymerization initiators include thermal initiators, chemical initiators, electron beam initiators, and photoinitiators. Photoinitiators include ketonic photoinitiators and/or phosphine oxide photoinitiators. When used in the curing of the coating composition, the photoinitiator is present in an amount sufficient to enable rapid radiation curing.

The curable primary coating composition optionally includes one or more additives. Additives include an adhesion promoter, a strength additive, an antioxidant, a catalyst, a stabilizer, an optical brightener, a property-enhancing additive, an amine synergist, a wax, a lubricant, and/or a slip agent. Some additives operate to control the polymerization process, thereby affecting the physical properties (e.g., modulus, glass transition temperature) of the polymerization product formed from the coating composition. Other additives affect the integrity of the cured product of the primary coating composition (e.g., protect against de-polymerization or oxidative degradation).

Secondary Coating—Compositions. The secondary coating 24 is a cured product of a curable secondary coating composition that includes a monomer, a photoinitiator, an optional oligomer, and an optional additive. The present disclosure describes optional oligomers for the radiation-curable secondary coating compositions, radiation-curable secondary coating compositions, cured products of the radiation-curable secondary coating compositions, optical fibers coated with a radiation-curable secondary coating composition, and optical fibers coated with the cured product of a radiation-curable secondary coating composition.

The secondary coating is formed as the cured product of a radiation-curable secondary coating composition that includes a monomer component with one or more monomers. The monomers preferably include ethylenically unsaturated compounds. In one embodiment, the secondary coating is the radiation-cured product of a secondary coating composition that contains urethane acrylate monomers.

The monomers include functional groups that are polymerizable groups and/or groups that facilitate or enable cross-linking. The monomers are monofunctional monomers or multifunctional monomers. In combinations of two or more monomers, the constituent monomers are monofunctional monomers, multifunctional monomers, or a combination of monofunctional monomers and multifunctional monomers. In one embodiment, the monomer component of the curable secondary coating composition includes ethylenically unsaturated monomers. Suitable functional groups for ethylenically unsaturated monomers include, without limitation, (meth)acrylates, acrylamides, N-vinyl amides, styrenes, vinyl ethers, vinyl esters, acid esters, and combinations thereof.

In one embodiment, the monomer component of the curable secondary coating composition includes ethylenically unsaturated monomers. The monomers include functional groups that are polymerizable groups and/or groups that facilitate or enable crosslinking. The monomers are monofunctional monomers or multifunctional monomers. In combinations of two or more monomers, the constituent monomers are monofunctional monomers, multifunctional monomers, or a combination of monofunctional monomers and multifunctional monomers. Suitable functional groups for ethylenically unsaturated monomers include, without limitation, (meth)acrylates, acrylamides, N-vinyl amides, styrenes, vinyl ethers, vinyl esters, acid esters, and combinations thereof.

Representative radiation-curable ethylenically unsaturated monomers included alkoxylated monomers with one or more acrylate or methacrylate groups. An alkoxylated monomer is one that includes one or more alkoxylene groups, where an alkoxylene group has the form —O—R— and R is a linear or branched hydrocarbon. Examples of alkoxylene groups include ethoxylene (—O—CH2-CH2-), n-propoxylene (—O—CH2-CH2-CH2-), isopropoxylene (—O—CH2-CH(CH3)-), etc. As used herein, the degree of alkoxylation refers to the number of alkoxylene groups in the monomer. In one embodiment, the alkoxylene groups are bonded consecutively in the monomer.

Multifunctional ethylenically unsaturated monomers for the curable secondary coating composition include, without limitation, alkoxylated bisphenol A diacrylates, such as ethoxylated bisphenol A diacrylate, with the degree of alkoxylation being 2 or greater. The monomer component of the secondary coating composition may include ethoxylated bisphenol A diacrylate with a degree of ethoxylation ranging from 2 to about 30 or propoxylated bisphenol A diacrylate with the degree of propoxylation being 2 or greater; for example, ranging from 2 to about 30; methylolpropane polyacrylates with and without alkoxylation such as ethoxylated trimethylolpropane triacrylate with the degree of ethoxylation being 3 or greater.

The curable secondary coating composition also includes a photoinitiator and optionally includes additives such as anti-oxidant(s), optical brightener(s), amine synergist(s), tackifier(s), catalyst(s), a carrier or surfactant, and a stabilizer as described above in connection with the curable primary coating composition.

A tertiary layer (e.g., ink layer) optionally surrounds or is directly adjacent to the secondary coating in the foregoing embodiment.

Optical Fiber Preform. In production, optical fibers are drawn from preforms. The preform is a dense glass monolith with a typical diameter between about 4 cm and 27 cm and a typical length between about 100 cm and 200 cm. The preform includes a central core region surrounded by an annular cladding region. The composition of the core and cladding regions of the preform correspond to the compositions of the core and cladding regions of an optical fiber drawn from the preform. The diameter of the core region of the preform and the thickness of the cladding region of the preform are in proportion to the core diameter and cladding thickness of an optical fiber drawn from the preform. The core region and/or cladding region of the preform may include multiple concentric layers that differ in dopant type or dopant concentration to provide optical fibers having a desired refractive index profile, such as the relative refractive index profiles described herein.

Silica and doped silica for the core and cladding regions of an optical fiber preform can be produced by methods known in the art. Suitable methods include flame combustion methods, flame oxidation methods, flame hydrolysis methods, OVD (outside vapor deposition), IVD (inside vapor deposition), VAD (vapor axial deposition), double crucible methods, rod-in-tube procedures, cane-in-soot method, and doped deposited silica processes. A variety of CVD (chemical vapor deposition) and plasma-enhanced CVD processes are known and are suitable for producing silica or doped silica.

Formation of silica occurs through reaction or decomposition of a silica precursor. Suitable precursors for silica include OMCTS (octamethylcyclotetrasiloxane) and SiCl4. Doping is accomplished with a doping precursor. The doping precursor can be introduced with the silica precursor in the deposition process or used to treat a silica body formed from the silica precursor. Preferred doping precursors include halogen-containing gases. Suitable precursors for doping silica with bromine include $SiBr_4$. Suitable precursors for doping silica with chlorine include $Cl_2$, $SiCl_4$, $Si_2Cl_6$, $Si_2OCl_6$, and $CCl_4$. Suitable precursors for doping silica with fluorine include $F_2$, $CF_4$, and $SiF_4$. The silica precursor and/or doping precursor is preferably provided as a gas to the deposition process. The gas phase silica precursor or gas phase doping precursor is supplied undiluted or in combination with an inert diluent gas (e.g., He, $N_2$, Ar).

Optical Fiber Draw Process. In a continuous optical fiber manufacturing process, a glass fiber is drawn from a heated preform and sized to a target diameter (typically 125 µm, corresponding to $r_4$=62.5 µm). The glass fiber is then cooled and directed to a coating system that applies a liquid primary coating composition to the glass fiber. Two process options are viable after application of the liquid primary coating composition to the glass fiber. In one process option (wet-on-dry process), the liquid primary coating composition is cured to form a solidified primary coating, the liquid secondary coating composition is applied to the cured primary coating, and the liquid secondary coating composition is cured to form a solidified secondary coating. In a second process option (wet-on-wet process), the liquid secondary coating composition is applied to the liquid primary coating composition, and both liquid coating compositions are cured simultaneously to provide solidified primary and secondary coatings. After the fiber exits the coating system, the fiber is collected and stored at room temperature. Collection of the fiber typically entails winding the fiber on a spool and storing the spool.

In some processes, the coating system further applies a tertiary coating composition to the secondary coating and cures the tertiary coating composition to form a solidified tertiary coating. Typically, the tertiary coating is an ink layer used to mark the fiber for identification purposes and has a composition that includes a pigment and is otherwise similar to the secondary coating. The tertiary coating is applied to the secondary coating and cured. The secondary coating has typically been cured at the time of application of the tertiary coating. The primary, secondary, and tertiary coating compositions can be applied and cured in a common continuous manufacturing process. Alternatively, the primary and secondary coating compositions are applied and cured in a common continuous manufacturing process, the coated fiber is collected, and the tertiary coating composition is applied and cured in a separate offline process to form the tertiary coating.

The wavelength of curing radiation is infrared, visible, or ultraviolet (UV). Representative wavelengths include wavelengths in the range from 250 nm to 1000 nm, or in the range from 250 nm to 700 nm, or in the range from 250 nm to 450 nm, or in the range from 275 nm to 425 nm, or in the range from 300 nm to 400 nm, or in the range from 320 nm to 390 nm, or in the range from 330 nm to 380 nm, or in the range from 340 nm to 370 nm. Curing can be accomplished with light sources that include a lamp source (e.g., Hg lamp), an LED source (e.g., a UVLED, visible LED, or infrared LED), or a laser source.

Each of the primary, secondary, and tertiary compositions are curable with any of the wavelengths and any of the light sources referred to above. The same wavelength or source can be used to cure each of the primary, secondary, and tertiary compositions, or different wavelengths and/or different sources can be used to cure the primary, secondary, and tertiary compositions. Curing of the primary, secondary, and tertiary compositions can be accomplished with a single wavelength or a combination of two or more wavelengths.

To improve process efficiency, it is desirable to increase the draw speed of the fiber along the process pathway extending from the preform to the collection point. As the draw speed increases, however, the cure speed of coating compositions must increase. The coating compositions disclosed herein are compatible with fiber draw processes that operate at a draw speed greater than 35 m/s, or greater than 40 m/s, or greater than 45 m/s, or greater than 50 m/s, or greater than 55 m/s, or greater than 60 m/s, or greater than 65 m/s, or greater than 70 m/s.

Disclosed are reduced diameter optical fibers 10 that have optical properties matched to those of single mode fibers have diameters greater than 180 microns, with compatible with low-cost manufacturing, and good macrobend and microbend performance and puncture resistance properties. The optical fiber 10 has a trench assisted design with the trench having a triangular shape and a trench volume greater than 30%-$\mu m^2$, and more particularly between 30%-$\mu m^2$ and 70%-$\mu m^2$, with the optical fiber having a mode field diameter (MFD) at 1310 nm of greater than 8.8 microns and demonstrating optical fiber properties compliant with ITU-G.657.A2 specification. In some embodiments, the glass diameter ($2r_4$) is less than 110 microns. In other embodiments, the glass diameter is less than 105 microns or less than 85 microns. In one embodiment, the glass diameter is between 124 μm and 126 μm, or about 125 μm. In one embodiment, the glass diameter is between 99 μm and 101 μm, or about 100 μm. In one embodiment, the glass diameter is between 79 μm and 81 μm, or about 80 μm. The fiber has a zero dispersion wavelength between 1300 nm and 1324 nm, a cable cutoff wavelength less than 1260 nm and macrobend loss at 1550 nm of less than 1.0 dB/turn for 15 mm mandrel diameter, of less than 0.2 dB/turn for 20 mm mandrel diameter and of less than 0.05 dB/10 turns for 30 mm mandrel diameter. In some embodiments, the fiber has a macrobend loss at 1550 nm of less than 0.5 dB/turn for 15 mm mandrel diameter, of less than 0.1 dB/turn for 20 mm mandrel diameter and of less than 0.03 dB/10 turns for 30 mm mandrel diameter. In some embodiments, the optical fiber 10 exhibits a puncture resistance of greater than 20 g. In other embodiments, the optical fiber 10 exhibits a puncture resistance of greater than 30 g. In still other embodiments, the optical fiber 10 exhibits a puncture resistance of greater than 40 g.

To provide cables with smaller diameters and having high fiber densities, optical fibers having a smaller outer diameter are desired. In some embodiments the optical fibers 10 have an outer coating diameter ($2r_6$) of less than or equal to 180 microns. In other embodiments, the optical fibers have an outer coating diameter of less than or equal to 170 microns. In still other embodiments, the optical fibers have an outer coating diameter of less than or equal to 165 microns. In yet other embodiments, the optical fibers have an outer coating diameter of less than or equal to 160 microns.

Furthermore, in cables where the optical fibers are packed tightly, the optical fibers are more sensitive to microbending, particularly at lower temperatures (e.g., <−10° C.). Additionally, it may be important to have optical fibers that have a mode field diameter (MFD) that is matched to a standard single mode fiber that results in lower coupling losses. In some embodiments, the optical fiber 10 has optical attributes that are compliant with ITU-G.652.D and ITU-G.657.A2 specifications and have a mode field diameter (MFD) at 1310 nm of equal to or greater than 8.8 microns. In other embodiments, the optical fiber has optical attributes that are compliant with ITU-G.652.D and ITU-G.657.A2 specifications and have a mode field diameter (MFD) at 1310 nm of equal to or greater than 9.0 microns. In still other embodiments, the optical fiber has optical attributes that are compliant with ITU-G.652.D and ITU-G.657.A2 specifications and have a mode field diameter (MFD) at 1310 nm of equal to or greater than 9.2 microns. The optical fiber exhibits MFD at 1310 nm of greater than 8.8 microns, a cable cutoff wavelength of less than 1260 nm, a zero dispersion wavelength of between 1300 nm and 1324 nm, a bend loss of less than 1.0 dB/turn at 1550 nm for one bend around a mandrel of diameter of 15 mm, a bend loss of less than 0.2 dB/turn at 1550 nm for one bend around a mandrel of diameter of 20 mm, and a bend loss of less than 0.05 dB/turn at 1550 nm for 10 turns around a mandrel of diameter of 30 mm.

The optical fiber 10 has a trench assisted design comprising a germania doped core region 30 having a core region radius $r_1$ maximum core index of $\Delta_{1max}$, an inner cladding region 32 having inner cladding radius $r_2$ and an average index of $\Delta_2$, a fluorine doped trench region 34 having trench radius $r_3$ and minimum trench index of $\Delta_{3\,min}$ and an outer cladding region 16 having a radius $r_4$ and average index of $\Delta_4$. For the purpose of this disclosure, the refractive index in each of the core region 30, inner cladding region 32 and trench region 34 segments are defined with respect to the refractive index of the outer cladding region 16, i.e., $\Delta_4$. In some embodiments, $\Delta_4$=0.0% $\Delta$. In some embodiments, the core region radius $r_1$ is between 4 microns and 6 microns. In some embodiments, the maximum core refractive index $\Delta_{1max}$ is between 0.3% $\Delta$ and 0.45% $\Delta$. In some embodiments, the core region is a step index with a core alpha ($\alpha$) of greater than 10. In other embodiments, the core region is a graded index core having a core alpha ($\alpha$) between 1.5 and 5. In some embodiments, the refractive index $\Delta_2$ is between −0.05% $\Delta$ to 0.05% $\Delta$. In the disclosed embodiments, the trench region is triangular in shape. In some embodiments, the minimum trench refractive index, $\Delta_{3\,min}$ is between −0.1% $\Delta$ and −0.5% $\Delta$. In other embodiments, the minimum trench refractive index, $\Delta_{3\,min}$ is between −0.15% $\Delta$ and −0.4% $\Delta$. In some embodiments, the trench volume is between 25%-$\mu m^2$ and 70%-$\mu m^2$. In other embodiments, the trench volume is between 30%-$\mu m^2$ and 60%-$\mu m^2$.

EXAMPLES

The optical fiber 10 is illustrated further through the following modelled examples. Each of the modelled example optical fibers 10 has a refractive index profile that includes a core region, an inner cladding region surrounding and directly adjacent to the core region, a trench cladding region surrounding and directly adjacent to the inner cladding region and an outer cladding region surrounding and directly adjacent to the trench cladding region. In each modelled example, the trench cladding region is a triangular trench.

Figure 2:
FIG. 2 is a graph illustrating the refractive index profile for an optical fiber having an offset triangular trench, according to one example.
Figure 3:
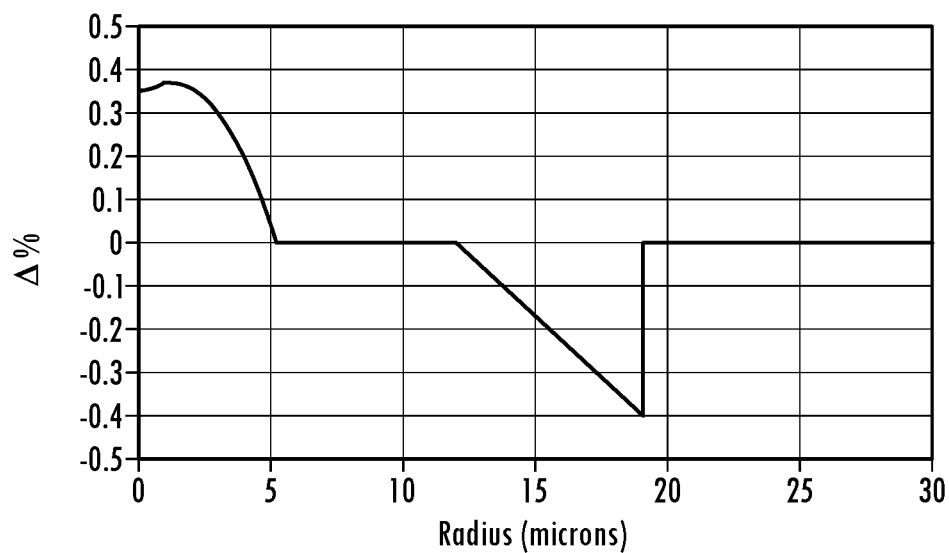
FIG. 3 is a graph illustrating the refractive index profile of an optical fiber having an offset triangular trench, according to another example.
Figure 4:
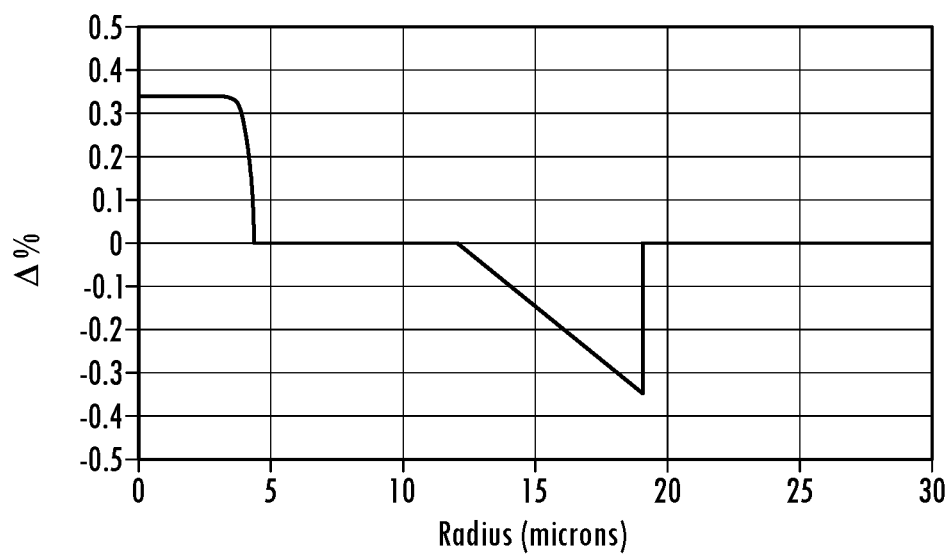
FIG. 4 is a graph illustrating a refractive index profile of an optical fiber having an offset triangular trench, according to a further example.

In FIG. 2 and Table 1 are shown modelled examples 1-4 of optical fibers having a triangular trench with a trench volume between 30%-μm² and 60%-μm², a MFD at 1310 nm of greater than 9.0 microns, a zero dispersion wavelength between 1300 nm and 1324 nm, a cable cutoff wavelength of less than 1260 nm, a bend loss at 1550 nm for 15 mm mandrel diameter of less than or equal to 0.5 dB/turn, a bend loss at 1550 nm for 20 mm mandrel diameter of less than or equal to 0.1 dB/turn and a bend loss at 1550 nm for 30 mm mandrel diameter of less than or equal to 0.0034 dB/turn In FIGS. 3 and 4 and Table 2 are shown modelled examples 5-8 of optical fibers having a triangular trench with a trench volume between 30%-μm² and 60%-μm², a MFD at 1310 nm of greater than 9.0 microns, a zero dispersion wavelength between 1300 nm and 1324 nm, a cable cutoff wavelength of less than 1260 nm, a bend loss at 1550 nm for 15 mm mandrel diameter of less than or equal to 0.5 dB/turn, a bend loss at 1550 nm for 20 mm mandrel diameter of less than or equal to 0.1 dB/turn and a bend loss at 1550 nm for 30 mm mandrel diameter of less than or equal to 0.0034 dB/turn.

Figure 5:
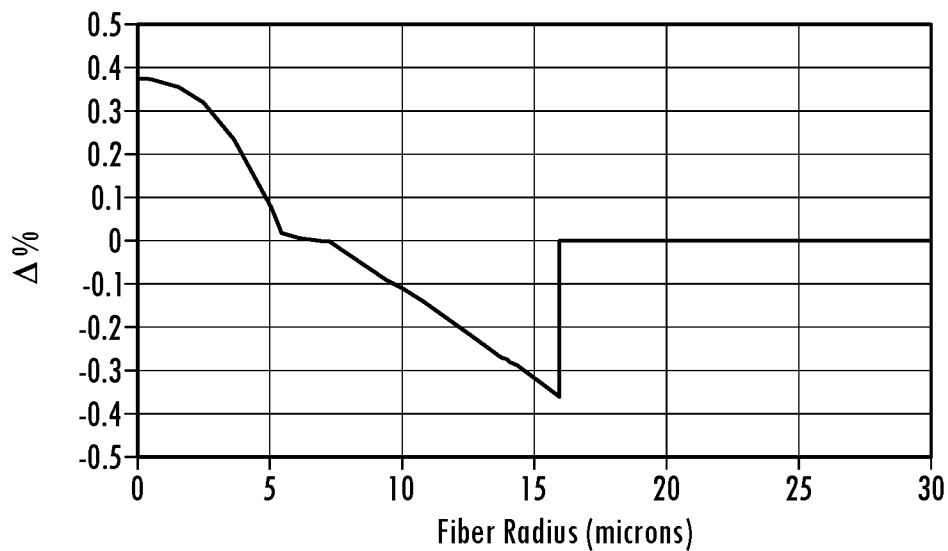
FIG. 5 is a graph illustrating a refractive index profile of an optical fiber having an offset triangular trench, according to a further example.

In FIG. 5 and Table 3 is shown modelled example 9 of an optical fiber having a triangular trench with a trench volume of 36%-μm², a cable cutoff wavelength of 1215 nm, a bend loss at 1550 nm for 15 mm mandrel diameter of 0.32 dB/turn, a bend loss at 1550 nm for 20 mm mandrel diameter of 0.06 dB/turn, and a bend loss at 1550 nm for 30 mm mandrel diameter of 0.002 dB/turn.

The modelled examples 1-9 illustrate optical fibers having trench cladding regions configured to minimize microbend losses at bend diameters of 15 millimeters, 20 millimeters and 30 millimeters, for example. FIGS. 2-5 show relative refractive index profiles for the various modelled examples of optical fibers. Table 1 lists parameters of the relative refractive index, radial dimensions, and selected properties for each of the modelled examples 1-4 optical fibers listed in Table 1. Table 2 lists parameter of the same selected properties for each of the modelled examples 5-8. Modelled characteristics of the exemplary optical fibers such as relative refractive index and outer radius of each region are listed in Tables 1-3 below.

TABLE 1

Refractive index profile parameters and optical properties of modelled examples 1-4.

|  | Example 1 | Example 2 | Example 3 | Example 4 |
|---|---|---|---|---|
| Maximum Core Index, $\Delta_{1max}$ (%) | 0.336 | 0.37 | 0.332 | 0.385 |
| Core Radius, $r_1$ (microns) | 4.2 | 5.3 | 4.55 | 5.65 |
| Core alpha (α) | 12 | 2.2 | 12 | 2.12 |
| Inner Cladding Index, $\Delta_2$ (%) | 0 | 0 | 0 | 0 |
| Inner Cladding Radius, $r_2$ (microns) | 7.16 | 7.45 | 9.46 | 8.3 |
| Trench Cladding Shape | Triangular | Triangular | Triangular | Triangular |
| Trench Cladding Minimum Index, $\Delta_{3min}$ (%) | −0.5 | −0.55 | −0.33 | −0.28 |
| Trench Cladding Outer Radius, $r_3$ (microns) | 15.9 | 14.9 | 18.9 | 16.6 |
| Trench Volume, $V_3$ (%- μm²) | −56.9 | −50.94 | −49.05 | −30 |
| Outer Cladding Index, $\Delta_4$ (%) | 0 | 0 | 0 | 0 |
| Outer Cladding Radius, $r_4$ (microns) | 62.5 | 62.5 | 62.5 | 62.5 |
| Mode Field Diameter (micron) at 1310 nm | 9.1 | 9.1 | 9.23 | 9.18 |
| Zero Dispersion Wavelength (nm) | 1314 | 1319 | 1317 | 1321 |
| Dispersion at 1310 nm (ps/nm/km) | −0.36 | −0.84 | −0.64 | −1.0 |
| Dispersion Slope at 1310 nm (ps/nm²/km) | 0.090 | 0.093 | 0.092 | 0.091 |
| Mode Field Diameter (micron) at 1550 nm | 10.21 | 10.22 | 10.34 | 10.41 |
| Dispersion at 1550 nm (ps/nm/km) | 18.32 | 18.27 | 18.2 | 17.61 |
| Dispersion Slope at 1550 nm (ps/nm²/km) | 0.064 | 0.065 | 0.065 | 0.063 |
| Cable Cutoff (nm) | 1226 | 1204 | 1213 | 1217 |
| Bend Loss for 15 mm mandrel diameter at 1550 nm (dB/turn) | 0.093 | 0.123 | 0.1611 | 0.199 |
| Bend Loss for 20 mm mandrel diameter at 1550 nm (dB/turn) | 0.023 | 0.113 | 0.0255 | 0.044 |
| Bend Loss for 30 mm mandrel diameter at 1550 nm (dB/turn) | 0.0025 | 0.0034 | 0.0032 | 0.0024 |
| Bend Loss for 30 mm mandrel diameter at 1550 nm (dB/10 turns) | 0.025 | 0.034 | 0.032 | 0.024 |

TABLE 2

Refractive index profile parameters and optical properties of modelled examples 5-8.

| | Example 5 | Example 6 | Example 7 | Example 8 |
|---|---|---|---|---|
| $\Delta_0$ (%) | 0.35 | 0.35 | 0.34 | 0.31 |
| $r_0$ (μm) | 1 | 0 | 0 | 1 |
| $\Delta_1$ (%) | 0.37 | 0.35 | 0.34 | 0.34 |
| $r_1$ (μm) | 5.2 | 5.2 | 4.35 | 4.4 |
| Alpha (α) | 2.5 | 4 | 20 | 12 |
| $\Delta_2$ (%) | 0 | 0 | 0 | 0 |
| $r_2$ (μm) | 12 | 12 | 12 | 13 |
| $W_2$ ($r_2 - r_1$, μm) | 6.8 | 6.8 | 7.65 | 8.6 |
| $\Delta_{3min}$ (μm) | −0.4 | −0.35 | −0.35 | −0.45 |
| $r_3$ (μm) | 19 | 19 | 19 | 19 |
| $W_3$ ($r_3 - r_2$, μm) | 7 | 7 | 7 | 6 |
| $V_3$ (%-μm$^2$) | −46.9 | −41 | −41 | −46.1 |
| $\Delta_4$ (%) | 0 | 0 | 0 | 0 |
| $r_4$ (μm) | 50 | 50 | 50 | 50 |
| $r_5$ (μm) | 62.5 | 62.5 | 62.5 | 62.5 |
| $r_6$ (μm) | 82.5 | 82.5 | 82.5 | 82.5 |
| MFD at 1310 nm (μm) | 9.08 | 9.30 | 9.08 | 9.11 |
| MFD at 1550 nm (μm) | 10.36 | 10.57 | 10.32 | 10.37 |
| Aeff at 1310 nm (μm$^2$) | 63.4 | 66.8 | 64.8 | 65.4 |
| Aeff at 1550 nm (μm$^2$) | 80.8 | 84.4 | 81.4 | 82.2 |
| Dispersion at 1310 nm (ps/nm/km) | −0.47 | −0.04 | −0.09 | −0.10 |
| Dispersion at 1550 nm (ps/nm/km) | 16.76 | 17.20 | 16.80 | 16.76 |
| Dispersion Slope at 1310 nm (ps/nm$^2$/km) | 0.088 | 0.088 | 0.086 | 0.086 |
| Zero Dispersion Wavelength (nm) | 1315.4 | 1310.5 | 1311.0 | 1311.2 |
| Cable Cutoff Wavelength (nm) | 1220 | 1220 | 1220 | 1210 |
| Bend loss for 15 mm mandrel diameter at 1550 nm (dB/turn) | 0.112 | 0.1905 | 0.1795 | 0.1673 |
| Bend loss for 20 mm mandrel diameter at 1550 nm (dB/turn) | 0.0296 | 0.0493 | 0.0464 | 0.0469 |
| Bend loss for 30 mm mandrel diameter at 1550 nm (dB/turn) | 0.0016 | 0.003 | 0.002 | 0.0023 |

TABLE 3

Refractive index profile parameters and optical properties of example 9 corresponding to the refractive index profile shown in FIG. 4.

| | Example 9 |
|---|---|
| Maximum Core Index, $\Delta_{1max}$ (%) | 0.3785 |
| Core Radius, $r_1$ (microns) | 5.5 |
| Core alpha (α) | 2.2 |
| Inner Cladding Index, $\Delta_2$ (%) | 0 |
| Inner Cladding Radius, $r_2$ (microns) | 7.3 |
| Trench Cladding Shape | Triangular |
| Trench Cladding Minimum Index, $\Delta_{3min}$ (%) | −0.36 |
| Trench Cladding Outer Radius, $r_3$ (microns) | 16 |
| Trench Volume, $V_3$ (% μm$^2$) | 36 |
| Outer Cladding Index, $\Delta_4$ (%) | 0 |
| Outer Cladding Radius, $r_4$ (microns) | 62.5 |
| Mode Field Diameter (microns) at 1310 nm | 9.2 |
| Zero Dispersion Wavelength (nm) | 1312 |
| Dispersion at 1310 nm (ps/nm/km) | −0.18 |
| Dispersion Slope at 1310 nm (ps/nm2/km) | 0.09 |
| Mode Field Diameter (microns) at 1550 nm | 10.32 |
| Dispersion at 1550 nm (ps/nm/km) | 18.35 |
| Dispersion Slope at 1550 nm (ps/nm2/km) | 0.065 |
| Cable Cutoff Wavelength (nm) | 1215 |
| Bend Loss for 15 mm mandrel diameter at 1550 nm (dB/turn) | 0.32 |
| Bend Loss for 20 mm mandrel diameter at 1550 nm (dB/turn) | 0.06 |
| Bend Loss for 30 mm mandrel diameter at 1550 nm (dB/turn) | 0.002 |

Microbending Attenuation

An approach for quantifying the microbending loss of an optical fiber on the properties of the coatings is published in the article entitled "Relationship of Mechanical Characteristics of Dual Coated Single Mode Fibers and Microbending Loss," by J. Baldauf, N. Okada and M. Miyamoto, in IEICE Trans. Commun., Vol. E76-B, No. 4, pp. 352-357 (April, 1993). The article discloses a parameter $\chi_s$, which is an effective spring constant for the force that couples the secondary (high-modulus) coating and the glass fiber. This spring constant parameterization provides qualitative guidance that a thick primary coating with a low modulus provides better microbending performance, but it does not fully capture the contributions of the glass fiber and the high-modulus secondary coating that surrounds and is directly adjacent to the primary coating.

The combined roles of the glass fiber, low-modulus primary coating, and high-modulus secondary coating result in a microbending attenuation penalty (MAP) of:

$$MAP = C_0 f_0 \sigma \frac{f_p f_{RIP}}{f_g f_s} \quad (1)$$

where $f_0$ and $\sigma$ are the average lateral pressure and standard deviation of the roughness of the external surface in contact with the secondary coating, respectively, and $C_0 = 10^{28}$. $f_{RIP}$ accounts for the role of the refractive index profile and is of order unity. Attenuation data indicates that $f_{RIP}$ is approximately 1.0 for single-mode fiber with a step-index refractive index profile and can be 0.5 or smaller for bend-insensitive single-mode fibers with refractive index profiles that include a depressed index trench in the cladding region, as in the examples illustrated in Table 1. The other three terms $f_g$, $f_p$ and $f_s$ in Eq. 1 are the contributions of the glass fiber, low-modulus primary coating and the high-modulus secondary coating to the microbending response and are given by:

$$f_g = \frac{\pi}{4} E_g^2 r_4^6,$$

$$f_p = \left(\frac{2E_p}{r_5 - r_4}\right)^2,$$

$$\text{and } f_s = \frac{\pi}{4} E_s [r_6^4 - r_5^4],$$

respectively, where $E_g$, $E_p$ and $E_s$ are the elastic moduli of the glass fiber, low-modulus primary coating and high-modulus secondary coating, respectively.

Figure 7:
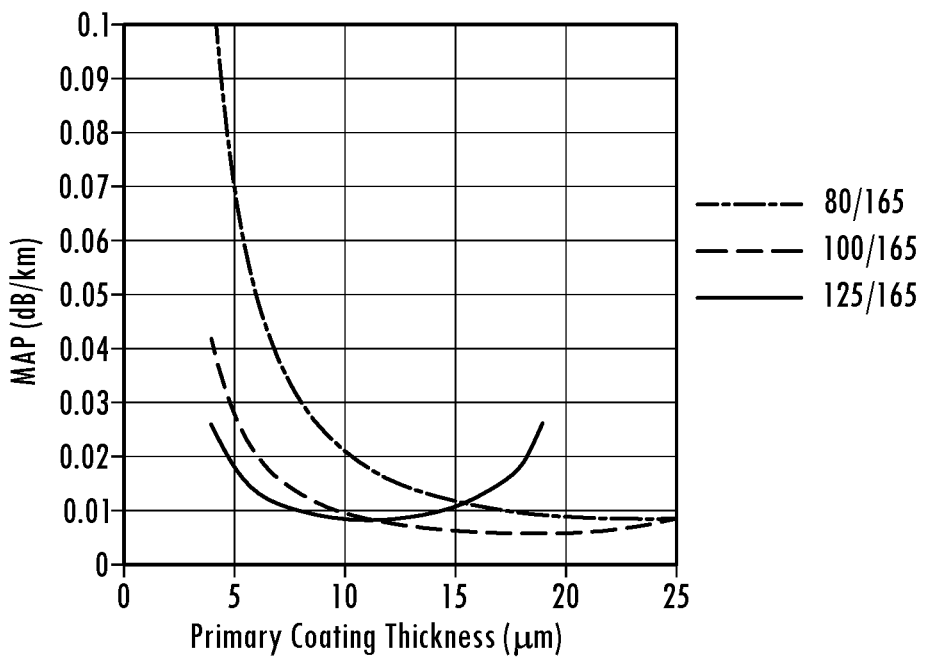
FIG. 7 is a graph illustrating microbend attenuation of the primary coating based on thickness, according to one example.

The MAP has units of dB/km when the units for the moduli and radii are GPa and microns, respectively. We assume that the fiber attenuation in the absence of any microbending attenuation penalty is approximately 0.17 dB/km, so the net attenuation of the coated optical fiber system is 0.17 dB/km plus the microbend attenuation penalty. The MAP is shown in FIG. 7 as a function of the primary coating thickness for examples of optical fibers having cladding diameters ($2r_4$) of 125 microns, 100 microns and 80 microns, and a secondary coating diameter ($2r_6$) of 165 microns.

Puncture Resistance

Figure 6:
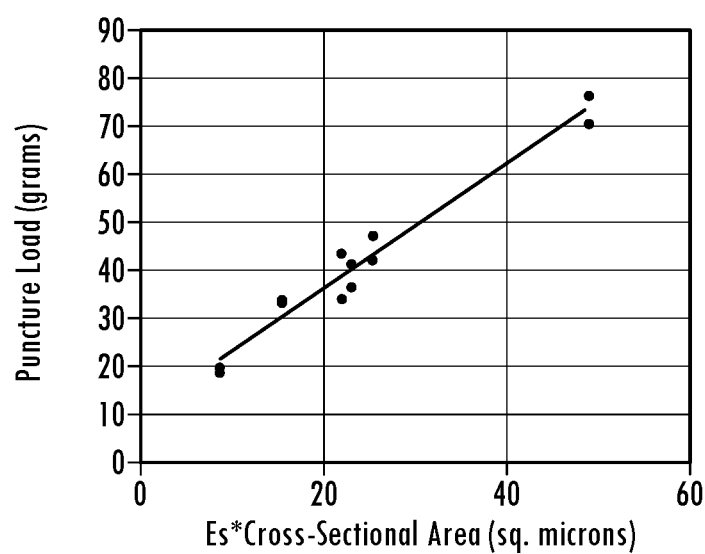
FIG. 6 is a graph illustrating the puncture resistance of an optical fiber particularly of the modulus and cross-sectional area of the secondary coating.

The puncture resistance measurement is disclosed by Glaesemann and Clark [G. S. Glaesemann and D. A. Clark, "Quantifying the Puncture Resistance of Optical Fiber Coatings," Proc. 52nd IWCS, pp. 237-245 (1993)] as a metric for quantifying the ability of coatings to protect the underlying glass surface from mechanical damage. The Glaesemann article discloses a method for measuring this characteristic and teaches that the puncture resistance of a coating system that includes a primary coating and a secondary coating depends linearly on the product of the secondary coating modulus $E_s$ and the cross-sectional area of the secondary coating, as shown in FIG. 6.

Our model assumes that the secondary coating is a thick-walled annulus, which is reasonable given that the ratio of the thickness of the secondary coating to the mean radius of the secondary coating is on the order of $15/150 \approx 10\%$. The hoop stress $\sigma_h$ is then given by Lamé's equation as follows:

$$\sigma_h = \frac{p_i r_i^2 - p_o r_o^2}{r_o^2 - r_i^2} + \frac{(p_i - p_o) r_o^2 r_i^2}{(r_o^2 - r_i^2) r^2},$$

where the i and o subscripts refer to the inner and outer surfaces of the secondary coating, respectively. Deformation of the secondary coating by a foreign object such as the diamond wedge indenter used by Glaesemann is a localized force that produces a pressure $p_o$ on the outer surface of the secondary coating that is much greater than the pressure $p_i$ exerted on the inside surface of the secondary coating by the low modulus primary coating. The hoop stress is maximum at $r=r_i$, and in the limit that the pressure $p_i$ on the inner surface of the secondary coating is zero, the maximum hoop stress is given by:

$$\sigma_{h,max} = \frac{-2 p_o r_o^2}{r_o^2 - r_i^2} \propto \frac{1}{A_s}$$

where $A_s = \pi(r_o^2 - r_i^2)$ is the cross-sectional areas of the secondary coating annulus. The puncture load is then proportional to $E_s / \sigma_{h,max} \propto E_s A_s$.

Figure 8:
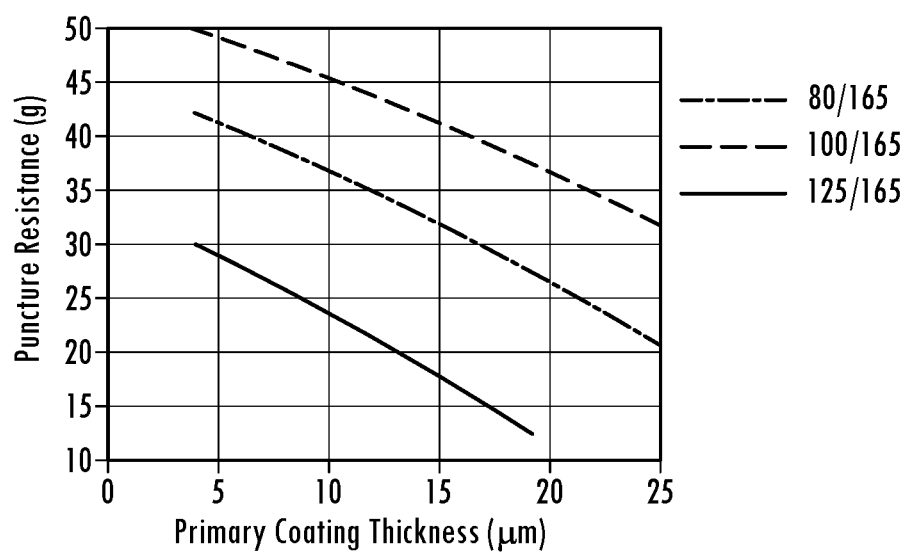
FIG. 8 is a graph illustrating the puncture resistance of the primary coating based on thickness, according to one example.

The puncture resistance in grams (g) is shown in FIG. 8 as a function of the primary coating thickness for the examples of the optical fibers subjected to puncture loads shown in FIG. 6 and having outer cladding diameters ($2r_4$) of 125 microns, 100 microns and 80 microns, and a secondary coating diameter ($2r_6$) of 165 microns. The puncture resistance is equal to the puncture load that is applied to the optical fiber. In the limit when the thickness of the primary coating becomes very small, the pressure exerted on the inside surface of the secondary coating is due to the glass, and the contribution of $p_i$ to the hoop stress cannot be ignored. The hoop stress is then given by $\sigma_h = -p_o$, which is a constant value that depends on the indent load and the surface area of the indenter. This prediction is consistent with the data plotted in FIG. 6, which shows the puncture load extrapolating to about 10 g in the limit of the cross-sectional area of the secondary coating going to zero. The complete expression for the puncture resistance (in units of g) is then $P_R = P_0 + C_1 E_s A_s$, where $E_s$ is the Young's modulus of the secondary coating (in units of MPa), and the coefficients $P_0$ and $C_1$ have values of about 10.03 g and 1.31 g/MPa/mm², respectively.

The primary coating has an in situ modulus preferably in the range from 0.05 MPa to 0.30 MPa. The in situ modulus measurements may include forming the primary coating on a glass fiber of a certain diameter. The in situ modulus measurements may be performed on a Rheometrics DMTA IV dynamic mechanical testing apparatus at a constant strain of $9e^{-6}$ 1/s for a time of forty-five (45) minutes at room temperature (21° C.). The gauge length may be set a distance such as 15 millimeters. The force and change in length may be recorded and used to calculate the in situ modulus of the primary coating. One example of an in situ modulus measurement is disclosed in U.S. Pat. No. 11,036,000, which is hereby incorporated herein by reference.

The secondary coating has a Young's modulus greater than 1600 MPa. The Young's modulus may be measured on films formed by the curing coating compositions forming the secondary coating. The Young's modulus may be measured on the film samples using a MTS Sintech tensile test instrument following procedures set forth in ASTM Standard D882-97. Young's modulus is defined as the steepest slope of the beginning of the stress-strain curve. Films may be tested at an elongation rate such as 2.5 cm/min with an additional gauge length such as 5.1 cm. One example of a Young's modulus test measurement is disclosed in U.S. Patent Application Publication No. 2018/0127593, which is hereby incorporated herein by reference.

Based on considerations of microbend attenuation penalty, puncture resistance, bend loss, and desirability of smaller fiber diameters, it is preferable for the primary coating to have an in situ modulus less than 0.50 MPa, such as an in situ modulus in a range from 0.05 MPa to 0.30 MPa or in a range from 0.10 MPa to 0.30 MPa, and a thickness $r_5 - r_4$ in a range from 5 microns to 30 microns, or in a range from 10 microns to 25 microns, or in a range from 10 microns to 22 microns, or in a range from 11 microns to 20 microns. It is further preferable for the secondary coating to have a Young's modulus greater than 1400 MPa or greater than 1600 MPa, or greater than 1800 MPa, or greater than 2000 MPa, such as a Young's modulus in a range from 1400 MPa to 3000 MPa or in a range from 1600 MPa to 2600 MPa, and a thickness $r_6 - r_5$ in a range from 5 microns to 25 microns, or in a range from 8 microns to 20 microns, or in a range from 8 microns to 17 microns, or in a range from 9 microns to 17 microns, or in a range from 9 microns to 16 microns.

Optical fibers having a coating system including the primary coating and secondary coating as disclosed herein have a puncture resistance greater than 15 g, or greater than 20 g, or greater than 30 g, or greater than 40 g, or in a range from 15 g to 50 g, or in a range from 20 g to 45 g, or in a range from 25 g to 40 g.

The described embodiments are preferred and/or illustrated, but are not limiting. Various modifications are considered within the purview and scope of the appended claims.

What is claimed is:

1. An optical fiber comprising:
   a core region having an outer radius $r_1$ in a range from 4.0 µm to 8.0 µm and a relative refractive index profile $\Delta_1$ with a maximum relative refractive index $\Delta_{1max}$ in a range from 0.20% to 0.50%;
   a cladding region surrounding and directly adjacent to the core region, the cladding region comprising:

a trench cladding region surrounding the core region, the trench cladding region having an inner radius $r_2$, an outer radius $r_3$, a relative refractive index $\Delta_3$ with a minimum relative refractive index $\Delta_{3\,min}$ greater than −0.60% and less than −0.10%, and a trench volume greater than 30%-μm²; and an outer cladding region surrounding and directly adjacent to the trench cladding region, the outer cladding region having an outer radius $r_4$ greater than 37.5 μm and less than 50.0 μm and a relative refractive index $\Delta_4$ in a range from −0.10% to 0.10%;

a primary coating surrounding and directly adjacent to the cladding region, the primary coating having a radius $r_5$, an in situ modulus in the range from 0.05 MPa to 0.30 MPa and a thickness $r_5$-$r_4$ in the range from 10 microns to 25 microns; and a secondary coating surrounding and directly adjacent to the primary coating, the secondary coating having a radius $r_6$ less than or equal to 85.0 microns, a Young's modulus greater than 1600 MPa and a thickness $r_6$-$r_5$ in the range from 8 microns to 20 microns;

wherein the optical fiber has a mode field diameter at 1310 nm of greater than 8.8 microns, a cable cutoff wavelength of less than 1260 nm and a zero dispersion wavelength between 1300 nm and 1324 nm;

wherein the optical fiber has a macrobend loss at 1550 nm, in accordance with a mandrel wrap test using a mandrel with a diameter of 15 mm, less than 0.5 dB/turn; and wherein the optical fiber has a macrobend loss at 1550 nm, in accordance with a mandrel wrap test using a mandrel with a diameter of 30 mm, less than 0.03 dB/10 turns.

2. The optical fiber of claim 1, wherein the shape of the trench cladding region is triangular.

3. The optical fiber of claim 1, wherein the outer cladding region has a radius r4 in the range from 37.5 to 42.5 μm.

4. The optical fiber of claim 1, wherein the thickness $r_5$-$r_4$ is in the range from 11 microns to 20 microns.

5. The optical fiber of claim 1, wherein the thickness $r_6$-$r_5$ is in the range from 9 microns to 17 microns.

6. The optical fiber of claim 1, wherein the optical fiber has a puncture resistance greater than 30 g.

7. The optical fiber of claim 1, wherein the optical fiber has a mode field diameter at 1310 nm of greater than 9.0 microns.

8. The optical fiber of claim 1, wherein the optical fiber has a mode field diameter at 1310 nm of greater than 9.2 microns.

9. An optical fiber comprising:
a core region having an outer radius $r_1$ in a range from 4.0 μm to 8.0 μm and a relative refractive index profile $\Delta_1$ with a maximum relative refractive index $\Delta_{1max}$ in a range from 0.20% to 0.50%;
a cladding region surrounding and directly adjacent to the core region, the cladding region comprising:
a trench cladding region surrounding the core region, the trench cladding region having an inner radius $r_2$, an outer radius $r_3$, a relative refractive index $\Delta_3$ with a minimum relative refractive index $\Delta_{3\,min}$ greater than −0.60% and less than −0.10%, and a trench volume greater than 30% μm²; and
an outer cladding region surrounding and directly adjacent to the trench cladding region, the outer cladding region having an outer radius $r_4$ greater than 37.5 μm and less than 45.0 μm and a relative refractive index $\Delta_4$ in a range from −0.10% to 0.10%;

a primary coating surrounding and directly adjacent to the cladding region, the primary coating having a radius $r_5$, an in situ modulus in the range from 0.05 MPa to 0.30 MPa and a thickness $r_5$-$r_4$ in the range from 10 microns to 22 microns; and a secondary coating surrounding and directly adjacent to the primary coating, the secondary coating having a radius $r_6$ less than or equal to 85.0 microns, a Young's modulus greater than 1600 MPa and a thickness $r_6$-$r_5$ in the range from 8 microns to 17 microns;

wherein the optical fiber has a mode field diameter at 1310 nm of greater than 8.8 microns, a cable cutoff wavelength of less than 1260 nm and a zero dispersion wavelength between 1300 nm and 1324 nm;

wherein the optical fiber has a macrobend loss at 1550 nm, in accordance with a mandrel wrap test using a mandrel with a diameter of 15 mm, less than 0.5 dB/turn; and wherein the optical fiber has a macrobend loss at 1550 nm, in accordance with a mandrel wrap test using a mandrel with a diameter of 30 mm, less than 0.03 dB/10 turns.

10. The optical fiber of claim 9, wherein the shape of the trench cladding region is triangular.

11. The optical fiber of claim 9, wherein the outer cladding region has a radius r4 in the range from 37.5 to 42.5 μm.

12. The optical fiber of claim 9, wherein the thickness $r_5$-$r_4$ in the range from 11 microns to 20 microns.

13. The optical fiber of claim 9, wherein the thickness $r_6$-$r_5$ in the range from 9 microns to 16 microns.

14. The optical fiber of claim 9, wherein the optical fiber has a puncture resistance greater than 30 g.

15. The optical fiber of claim 9, wherein the optical fiber has a mode field diameter at 1310 nm of greater than 9.0 microns.

16. The optical fiber of claim 9, wherein the optical fiber has a mode field diameter at 1310 nm of greater than 9.2 microns.

17. An optical fiber comprising:
a core region having an outer radius $r_1$ in a range from 4.0 μm to 8.0 μm and a relative refractive index profile $\Delta_1$ with a maximum relative refractive index $\Delta_{1max}$ in a range from 0.20% to 0.50%;
a cladding region surrounding and directly adjacent to the core region, the cladding region comprising:
a trench cladding region surrounding the core region, the trench cladding region having an inner radius $r_2$, an outer radius $r_3$, a relative refractive index $\Delta_3$ with a minimum relative refractive index $\Delta_{3\,min}$ greater than −0.60% and less than −0.10%, and a trench volume greater than 30%-μm²; and
an outer cladding region surrounding and directly adjacent to the trench cladding region, the outer cladding region having an outer radius $r_4$ greater than 37.5 μm and less than 45.0 μm and a relative refractive index $\Delta_4$ in a range from −0.10% to 0.10%;

a primary coating surrounding and directly adjacent to the cladding region, the primary coating having a radius $r_5$, an in situ modulus in the range from 0.05 MPa to 0.30 MPa and a thickness $r_5$-$r_4$ in the range from 10 microns to 25 microns; and a secondary coating surrounding and directly adjacent to the primary coating, the secondary coating having a radius $r_6$ less than or equal to 85.0 microns, a Young's modulus greater than 1600 MPa and a thickness $r_6$-$r_5$ in the range from 8 microns to 20 microns;

wherein the optical fiber has a mode field diameter at 1310 nm of greater than 8.8 microns, a cable cutoff wavelength of less than 1260 nm and a zero dispersion wavelength between 1300 nm and 1324 nm;

wherein the optical fiber has a macrobend loss at 1550 nm, in accordance with a mandrel wrap test using a mandrel with a diameter of 15 mm, less than 0.5 dB/turn; and wherein the optical fiber has a macrobend loss at 1550 nm, in accordance with a mandrel wrap test using a mandrel with a diameter of 30 mm, less than 0.03 dB/10 turns.

18. The optical fiber of claim 17, wherein the shape of the trench cladding region is triangular.

19. The optical fiber of claim 17, wherein the outer cladding region has a radius r4 in the range from 37.5 to 42.5 μm.

20. The optical fiber of claim 17, wherein the thickness $r_5-r_4$ in the range from 11 microns to 20 microns.

21. The optical fiber of claim 17, wherein the thickness $r_6-r_5$ in the range from 9 microns to 16 microns.

22. The optical fiber of claim 17, wherein the optical fiber has a puncture resistance greater than 30 g.

23. The optical fiber of claim 17, wherein the optical fiber has a mode field diameter at 1310 nm of greater than 9.2 microns.

* * * * *